US010080002B2

(12) United States Patent
Kasuga et al.

(10) Patent No.: US 10,080,002 B2
(45) Date of Patent: Sep. 18, 2018

(54) PROJECTION APPARATUS, PROJECTOR, AND PROJECTOR CONTROLLING METHOD

(71) Applicant: SEIKO EPSON CORPORATION, Tokyo (JP)

(72) Inventors: Hirofumi Kasuga, Matsumoto (JP); Naoya Nishimura, Matsumoto (JP); Yasuhiro Tojo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/477,460

(22) Filed: Apr. 3, 2017

(65) Prior Publication Data

US 2017/0295349 A1 Oct. 12, 2017

(30) Foreign Application Priority Data

Apr. 11, 2016 (JP) ................................ 2016-079142
Jan. 13, 2017 (JP) ................................ 2017-004282

(51) Int. Cl.
*G03B 21/14* (2006.01)
*H04N 9/31* (2006.01)
(Continued)

(52) U.S. Cl.
CPC ........... *H04N 9/3147* (2013.01); *G03B 21/13* (2013.01); *G03B 21/142* (2013.01);
(Continued)

(58) Field of Classification Search
CPC .. H04N 9/3185; H04N 9/3147; G06F 3/1446; G09G 2300/026
See application file for complete search history.

(56) References Cited

U.S. PATENT DOCUMENTS 8,197,070 B2 * 6/2012 Tan ........................ G01B 11/25
353/31
8,711,213 B2 * 4/2014 Furui ....................... H04N 9/31
348/135
(Continued)

FOREIGN PATENT DOCUMENTS

JP 2015-103880 A 6/2015
JP 2015-121779 A 7/2015

*Primary Examiner* — William C Dowling
(74) *Attorney, Agent, or Firm* — Oliff PLC

(57) ABSTRACT

A projection system including a first projector and a second projector project images side by side, wherein the first projector includes a first projection section that projects a first image and a first control section that causes the first projection section to project an identification image containing identification information, and the second projector includes a second projection section that projects a second image, an imaging section that captures an image of a range including the projection range of the second projection section to produce a captured image, and a second control section that causes the imaging section to capture an image of the identification image projected by the first projector, acquires the identification information on the first projector based on the captured identification image, and determines the position of the first image relative to the second image based on the position of the identification image in the captured image.

6 Claims, 14 Drawing Sheets

(51) Int. Cl.
*G06K 7/10* (2006.01)
*G03B 21/13* (2006.01)
*G06F 3/14* (2006.01)

(52) U.S. Cl.
CPC ......... *G03B 21/145* (2013.01); *G06F 3/1446* (2013.01); *G06K 7/1095* (2013.01); *H04N 9/3185* (2013.01); *G09G 2300/026* (2013.01)

(56) References Cited

U.S. PATENT DOCUMENTS

| | | | |
|---|---|---|---|
| 2010/0007578 A1* | 1/2010 | Kikuchi | G06F 3/0481 345/2.2 |
| 2015/0138240 A1 | 5/2015 | Hiranuma | |
| 2015/0279037 A1* | 10/2015 | Griffin | G06F 3/1446 345/1.3 |

* cited by examiner

| STATUS | PROJECTOR NAME | IP ADDRESS |
| --- | --- | --- |
| 1 | A | 0:0:0:1 |
| 2 | B | 0:0:0:90 |
| 3 | C | 0:0:0:40 |
| 4 | D | 0:0:0:20 |
| 5 | E | 0:0:0:70 |

| STATUS | PROJECTOR NAME | IP ADDRESS |
|---|---|---|
| −5 | A | 0:0:0:1 |
| −4 | B | 0:0:0:90 |
| −3 | C | 0:0:0:40 |
| −2 | D | 0:0:0:20 |
| −1 | E | 0:0:0:70 |

| STATUS | PROJECTOR NAME | IP ADDRESS |
|---|---|---|
| −2 | A | 0:0:0:1 |
| −1 | B | 0:0:0:90 |
| 1 | C | 0:0:0:40 |
| 2 | D | 0:0:0:20 |
| 3 | E | 0:0:0:70 |

| INPUT SIGNAL DETECTION ABNORMALITY | PROJECTOR TEMPERATURE ABNORMALITY (HIGH TEMPERATURE) | LAMP VOLTAGE ABNORMALITY (BURNT-OUT LAMP) |
|---|---|---|
| FAN OUT-OF-ORDER ABNORMALITY | LAMP COVER OPEN ABNORMALITY | POWER SUPPLY ABNORMALITY |
FIG.18
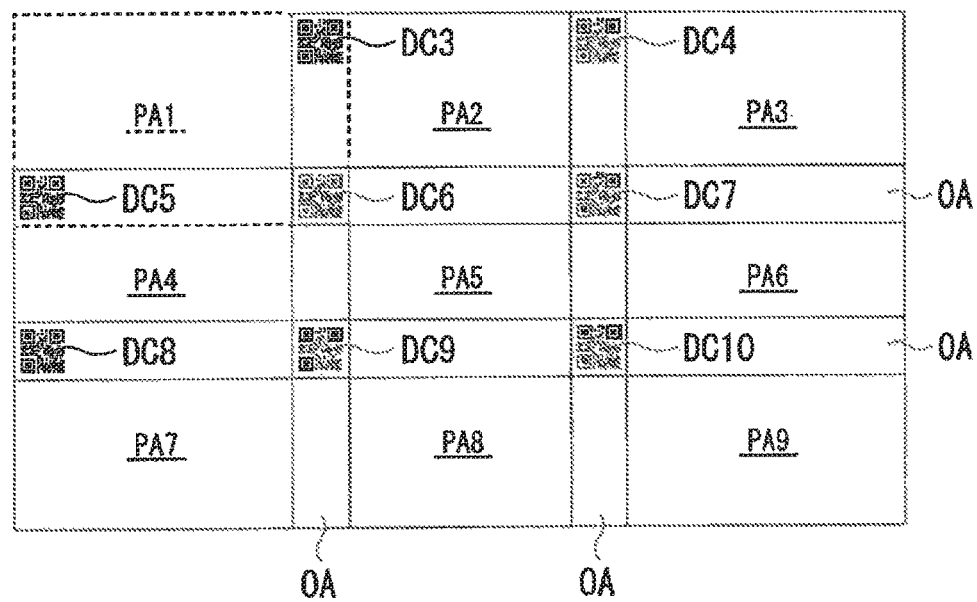
FIG.19
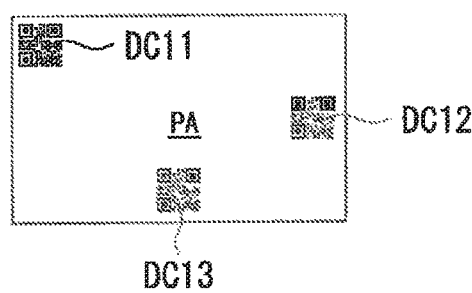
FIG.20

PROJECTION APPARATUS, PROJECTOR, AND PROJECTOR CONTROLLING METHOD

The entire disclosure of Japanese Patent Application Nos. 2016-079142, filed Apr. 11, 2016 and 2017-004282, filed Jan. 13, 2017 are expressly incorporated by reference herein.

BACKGROUND

1. Technical Field

The present invention relates to a projection system, a projector, and a projector controlling method.

2. Related Art

There is a disclosed system of related art that uses a plurality of projectors to project a single image. In the system, a personal computer is connected to the projectors, and the connected personal computer causes the projectors to adjust the positions of projection images (see JP-A-2015-121779, for example).

To adjust the position of each of the plurality of projectors, however, it is necessary to determine the positional relationship among the images projected from the plurality of projectors, that is, it is necessary to determine which projector projects an image in which position, but JP-A-2015-121779 does not disclose how to achieve the positional relationship.

SUMMARY

An advantage of some aspects of the invention is to provide a projection system, a projector, and a projector controlling method for readily determining the positional relationship among images projected from a plurality of projectors.

An aspect of the invention is directed to a projection system in which a plurality of projectors including a first projector and a second projector project images side by side. The first projector includes a first projection section that projects a first image and a first control section that causes the first projection section to project an identification image containing identification information, and the second projector includes a second projection section that projects a second image, an imaging section that captures an image of a range including a projection range of the second projection section to produce a captured image, and a second control section that causes the imaging section to capture an image of the identification image projected by the first projector, acquires the identification information on the first projector based on the captured identification image, and determines a position of the first image relative to the second image based on a position of the identification image in the captured image.

In the thus configured projection system, the imaging section is configured to capture an image of the identification image projected by the first projector, the identification information on the first projector is acquired based on the captured identification image, and the position of the first image relative to the second image is determined based on the position of the identification image in the captured image. Therefore, in the projection system, the positional relationship between the images projected from the plurality of projectors can be readily determined.

In the projection system according to the aspect of the invention, the first control section may cause the first projection section to project the identification image in such a way that the identification image is displayed in a peripheral portion of a projection range of the first projection section.

In the thus configured projection system, the first projection section is configured to project the identification image in such a way that the identification image is displayed in a peripheral portion of the projection range of the first projection section. Therefore, in the projection system, the imaging section can capture an image of the identification image even in a case where the imaging range of the imaging section is not very wide.

In the projection system according to the aspect of the invention, the first projector may include a first communication section, the second projector may include a second communication section, the identification image may contain connection information for connection with the first projector, the second control section may acquire the connection information based on the captured identification image, and the second communication section may establish connection with the first communication section and perform communication therewith based on the connection information acquired by the second control section.

In the thus configured projection system, the connection information is acquired based on the captured identification image, and the second communication section establishes connection with the first communication section and performs communication therewith based on the connection information acquired by the second control section. Therefore, in the projection system, communication can therefore be performed.

In the projection system according to the aspect of the invention, the second projector may include an address changing section that changes an address of the first projector.

In the thus configured projection system, the address of one of the projectors is changed. Therefore, in projection system, the address can therefore be changed.

Another aspect of the invention is directed to a projector including a projection section that projects a third image, an imaging section that captures an image of a range including a projection range of the projection section to produce a captured image, and a control section that causes the imaging section to capture an image of an identification-information-containing identification image projected by another projector that projects an image in such a way that the image projected by the projector and the image projected by the other projector are arranged side by side, acquires the identification information on the other projector based on the captured identification image, and determines a position of a fourth image projected from the other projector relative to the third image based on a position of the identification image in the captured image.

In the thus configured projector, the identification information on the other projector is acquired based on the captured identification image, and the position of the fourth image projected from the other projector relative to the third image is determined based on the position of the identification image in the captured image. The projector therefore allows the positional relationship between the images projected from the plurality of projectors to be readily determined.

Another aspect of the invention is directed to a projector controlling method for controlling a projector including a projection section that projects a third image and an imaging section that captures an image of a range including a projection range of the projection section to produce a captured image, the method including causing the imaging section to capture an image of an identification-information-containing identification image projected by another projector that projects an image in such a way that the image projected by the projector and the image projected by the other projector are arranged side by side, acquiring the identification information on the other projector based on the captured identification image, and determining a position of a fourth image projected from the other projector relative to the third image based on a position of the identification image in the captured image.

In the thus configured projector controlling method, the identification information on the other projector is acquired based on the captured identification image, and the position of the fourth image projected from the other projector relative to the third image is determined based on the position of the identification image in the captured image. Therefore, in the projector controlling method, the positional relationship between the images projected from the plurality of projectors can be readily determined.

As described above, in the projection system, the projector, and the projector controlling method according to the aspects of the invention, the imaging section is configured to capture an image of the identification image projected by the first projector, the identification information on the first projector is acquired based on the captured identification image, and the position of the first image relative to the second image is determined based on the position of the identification image in the captured image. Therefore, in the projection system, the projector, and the projector controlling method, the positional relationship between the images projected from the plurality of projectors can be readily determined.

BRIEF DESCRIPTION OF THE DRAWINGS

The invention will be described with reference to the accompanying drawings, wherein like numbers reference like elements.

FIG. 18 shows an example of an emergency list table.

FIG. 19 is a descriptive diagram showing that 9 projectors arranged in a matrix formed of 3 rows and 3 columns project images.

FIG. 20 shows an example of the position of the identification image projected in an overlapping projection area by a projector.

DESCRIPTION OF EXEMPLARY EMBODIMENTS

First Embodiment

A series of actions in tiling operation performed by high-luminous-flux projectors will be described in detail in an embodiment of the invention with reference to the drawings.

Basic Configuration of System

A business agent who installs projectors sets a scaffold and installs the projectors in accordance with an installation drawing designed in advance. The number of projectors to be installed is not limited, and the description of the present embodiment will be made with reference to a case where three projectors are installed alongside of one another in the rightward/leftward direction.

Figure 1:
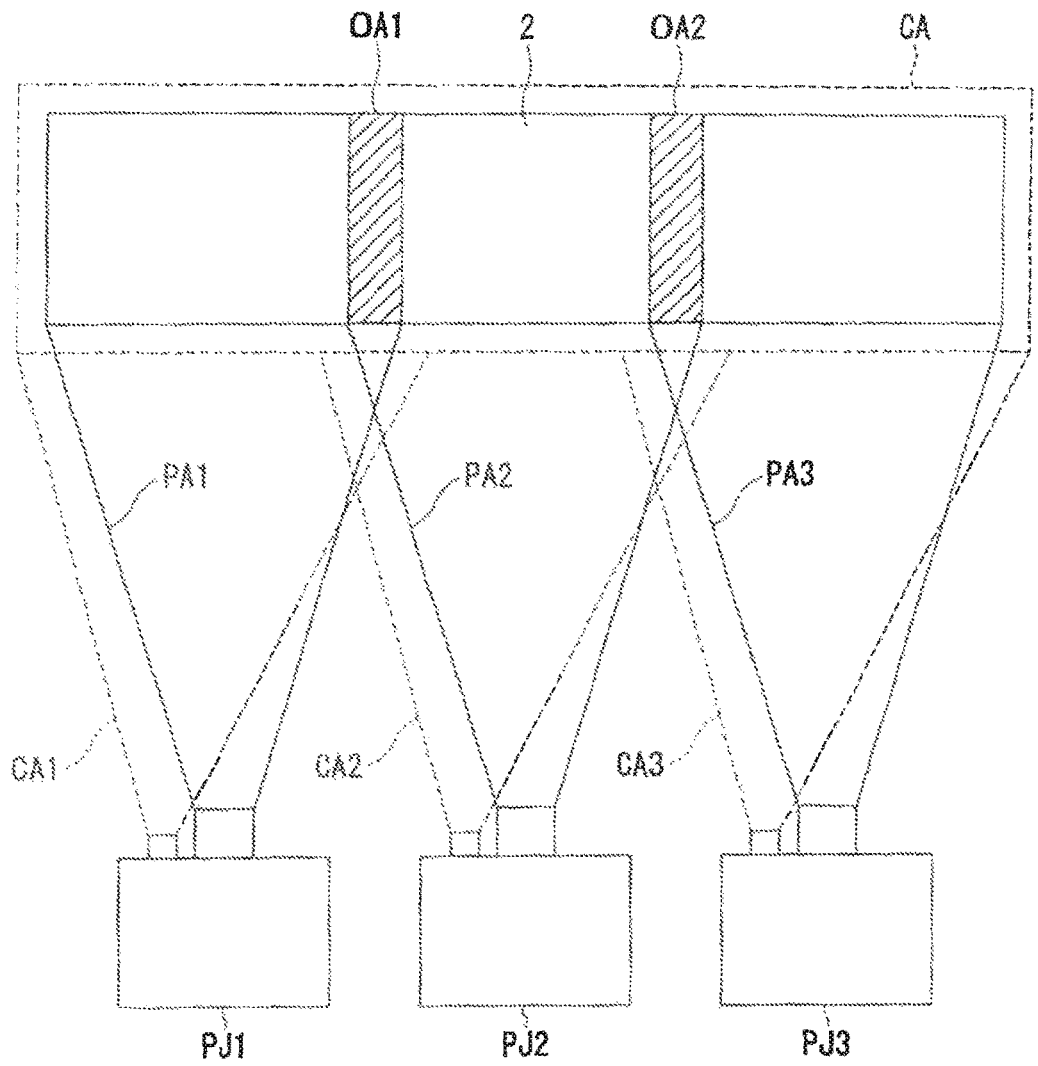
FIG. 1 shows an example of a schematic configuration of a projection system according to an embodiment of the invention.

FIG. 1 shows an example of a schematic configuration of a projection system 1 according to an embodiment of the invention. The projection system 1 includes a projector PJ1, a projector PJ2, and a projector PJ3. In the following description, in a case where the projectors PJ1, PJ2, and PJ3 are not distinguished from one another, they are collectively called projectors PJ.

Each of the projectors PJ projects an image on a projection surface 2 (hereinafter referred to as screen). The images projected from the projectors PJ are displayed on the screen.

The projectors PJ1, PJ2, and PJ3 undergo projection adjustment that causes the projection images overlap with each other. In one example shown in FIG. 1, the projection adjustment is so performed that a right end portion of an area PA1 of the projection image projected by the projector PJ1 overlaps with a left end portion of an area PA2 of the projection image projected by the projector PJ2. The projection adjustment is further so performed that a right end portion of the area PA2 of the projection image projected by the projector PJ2 overlaps with a left end portion of an area PA3 of the projection image projected by the projector PJ3. In the following description, in a case where the projection image area PA1, the projection image area PA2, and the projection image area PA3 are not distinguished from one another, they are referred to as a projection image area PA.

In the example shown in FIG. 1, the three projectors are arranged alongside of one another, but the projection system 1 may instead be formed of two or four or more projectors. Further, the projectors are not necessarily arranged in the rightward/leftward direction and may instead be arranged in the upward/downward direction or may be arranged in the upward/downward and rightward/leftward directions in a matrix.

Configuration of Projector PJ

Figure 2:
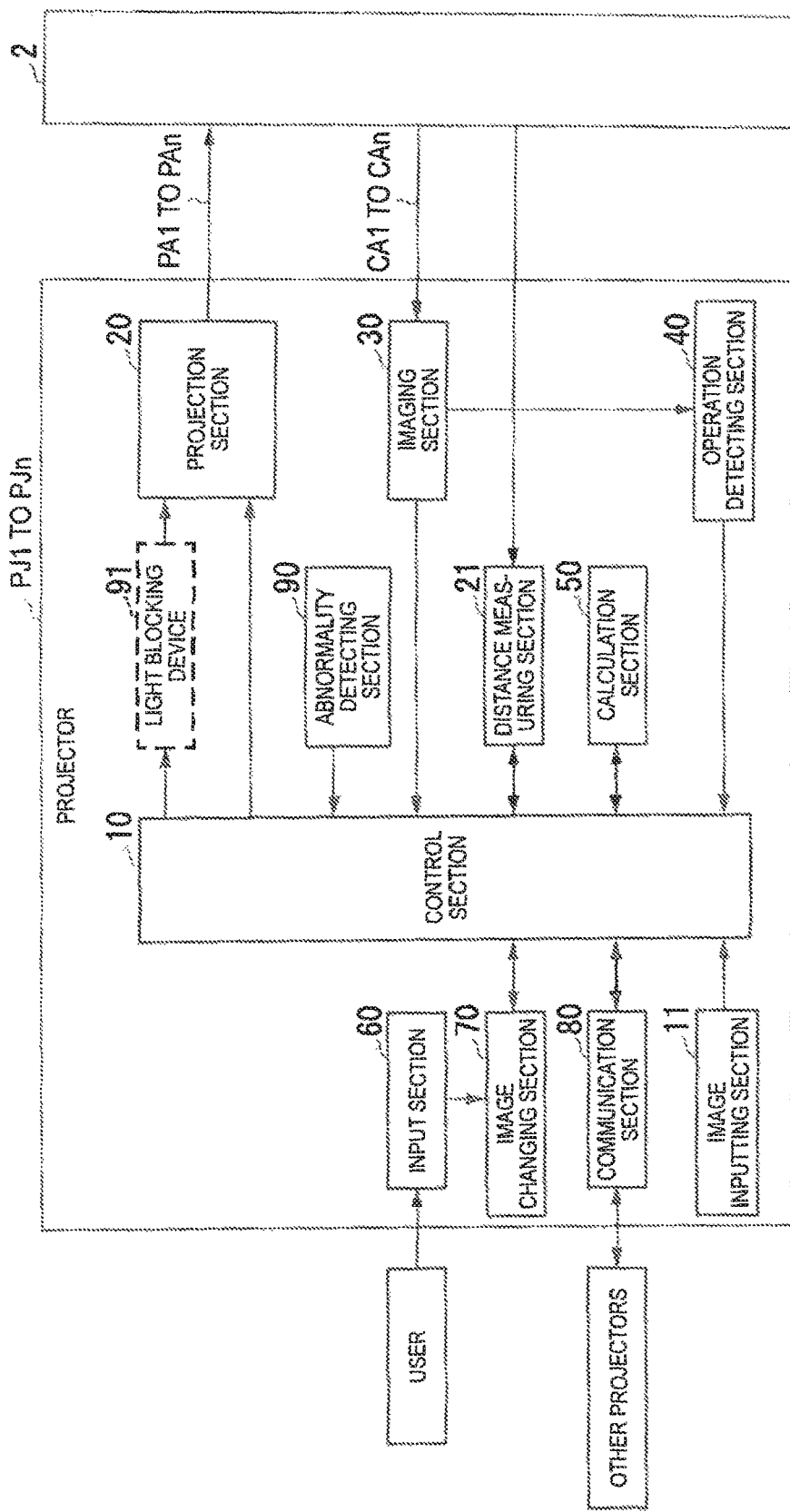
FIG. 2 is a block diagram showing an example of the configuration of a projector.

The configuration of each of the projectors PJ will next be described with reference to FIG. 2. FIG. 2 is a block diagram showing an example of the configuration of each of the projectors PJ.

Each of the projectors PJ includes a control section 10, a projection section 20, an imaging section 30, an operation detecting section 40, an input section 60, an image changing section 70, a communication section 80, an abnormality detecting section 90, a light blocking device 91, a distance measuring section 21, and an image inputting section 11.

The control section 10 is connected to the operation detecting section 40, the communication section 80, the image inputting section 11, the light blocking device 91, the projection section 20, the abnormality detecting section 90, the imaging section 30, the distance measuring section 21, a calculation section 50, and the image changing section 70.

The projection section 20 receives a projection image supplied from the control section 10. The projection section 20 projects the supplied projection image on the screen. Specifically, the projection section 20 provided in the projector PJ1 projects an image in the projection image region PA1, as shown in FIG. 1. The projection section 20 provided in the projector PJ2 projects an image in the projection image region PA2. The projection section 20 provided in the projector PJ3 projects an image in the projection image region PA3.

The projection section 20 includes a light source (not shown) used to perform projection, such as a lamp, a light modulator (not shown) that modulates light emitted from the light source to form an image, such as a liquid crystal panel, a projection lens (not shown) that projects the formed image, and other components.

The imaging section 30 captures an image of an area including a projection image projected by the projection section 20 on the screen. The imaging section 30 supplies the control section 10 with the captured image. Specifically, the imaging section 30 provided in the projector PJ1 captures an image of an imaging range CA1 including the projection image area PA1, as shown in FIG. 1. The imaging section 30 provided in the projector PJ2 captures an image of an imaging range CA2 including the projection image area PA2. The imaging section 30 provided in the projector PJ3 captures an image of an imaging range CA3 including the projection image area PA3. An imaging range CA is the combination of the imaging ranges CA1, CA2, and CA3.

The operation detecting section 40 detects specifying operation from the captured image captured with the imaging section 30. The operation detecting section 40 supplies the control section 10 with the detected specifying operation. The specifying operation refers to a user's operation of specifying a projection image display range of the projectors PJ.

The calculation section 50 calculates the size of the projection image display range on the screen. The calculation section 50 supplies the control section 10 with the calculated projection image display range. The control section 10 causes the projector PJ to project the size of the projection image display range.

The input section 60 accepts an input of the projection image display range of the projector PJ from the user. The input section 60 supplies the image changing section 70 with the inputted projection image display range.

The image changing section 70 changes a frame image showing the projection image display range supplied from the input section 60. The image changing section 70 supplies the control section 10 with the changed frame image.

The communication section 80 is connected to the communication sections 80 provided in the other projectors.

The abnormality detecting section 90 detects an abnormality in the projector. The abnormality detecting section 90 supplies the control section 10 with the detected abnormality. For example, the abnormality detecting section 90 monitors functions necessary for normal operation of the projector, such as a signal inputted from the image inputting section 11 and voltage of the lamp provided in the projection section 20. The abnormality detecting section 90, when it detects an abnormality that causes the projector not to operate normally, supplies the control section 10 with the detected abnormality.

The light blocking device 91 is connected to the projection section 20. The light blocking device 91 includes a shutter (not shown) that blocks a projection image projected from the projection section 20.

The image inputting section 11 receives a projection image externally inputted to the projector. The image inputting section 11 supplies the control section 10 with the inputted image.

The distance measuring section 21 measures the distance between the projector PJ in which the distance measuring section 21 is provided and the screen. The distance measuring section 21 supplies the control section 10 with the measured distance.

Each of the projectors PJ includes the sections described above.

The portions where projection images from the projectors PJ overlap with each other are each called an overlapping projection area OA. A specific example of the overlapping projection area OA is an overlapping projection area OA1, where the projection image area PA1 and the projection image area PA2 overlap with each other. Another example of the overlapping projection area OA is an overlapping projection area OA2, where the projection image area PA2 and the projection image area PA3 overlap with each other. In a case where the overlapping projection areas OA1 and OA2 are not distinguished from each other, they are referred to as an overlapping projection area OA.

The projectors PJ adjust the luminance of projection images in such a way that the luminance of the overlapping projection areas OA is equal to the luminance of the area excluding the overlapping projection areas OA. The projectors PJ can therefore project, on the screen, projection images having unified luminance even with the overlapping portions present in projection images.

Inter-Projector Coordinated Task

The user can readily obtain a tiled projection screen irrespective of the number of installed projectors by using the procedure described below. The procedure will be described below.

In the present embodiment, the projectors PJ are connected to each other via the communication sections 80 provided therein by using a wireless LAN (local area network). The communication sections 80 provided in the projectors PJ may be connected to each other by using a different connection method, such as wired LAN connection and USB (universal serial bus) connection.

When the projectors PJ are powered on, the user determines a main projector. The main projector may be any of the projectors in the projection system 1. In the description of the present embodiment, the projector PJ1 is the main projector. The projector PJ1 is the leftmost projector in the projection system 1, as shown in FIG. 1.

Each of the other projectors in the projection system 1 sends information via the communication section 80 provided in the projector simultaneously with the power-on action of the projector. The sent information contains the name of the projector, the IP (Internet Protocol) address assigned to the projector, and other pieces of information.

Figures 3, 4:
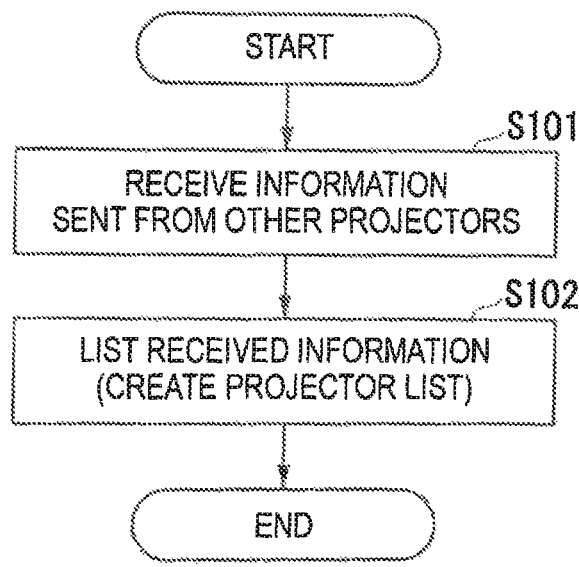
FIG. 3 is a flowchart showing an example of the procedure of an inter-projector coordinated task in the present embodiment.
FIG. 4 shows an example of a list created by a main projector in the present embodiment.

An example of the procedure of the inter-projector coordinated task will next be described with reference to FIG. 3.

The main projector receives, via the communication section 80, the information sent from the other projectors in the projection system 1 (step S101). The main projector uses the received information to create a list formed of the projector names and IP addresses of the other projectors related to each other (step S102).

The list created by the main projector will next be described with reference to FIG. 4. In the following description, a case where the projection system 1 is formed of five projectors is presented by way of example.

In the list are recorded information on the status of each of the projectors, information on the projector name of each of the projectors, and information on the IP address assigned to each of the projectors with the three pieces of information related to one another. Specifically, the list stores "1" as the status information, "A" as the projector name information, and "0:0:0:1" as the IP address information with the three pieces of information related to one another. The list further stores "2" as the status information, "B" as the projector name information, and "0:0:0:90" as the IP address information with the three pieces of information related to one another. The list further stores "3" as the status information, "C" as the projector name information, and "0:0:0:40" as the IP address information with the three pieces of information related to one another. The list further stores "4" as the status information, "D" as the projector name information, and "0:0:0:20" as the IP address information with the three pieces of information related to one another. The list further stores "5" as the status information, "E" as the projector name information, and "0:0:0:70" as the IP address information with the three pieces of information related to one another.

The user can check the list described above by connecting a personal computer to the main projector and reading the list via the personal computer. Instead, the main projector may cause the projectors PJ to project the items of the list described above in the form of projection images on the screen.

The main projector then identifies the arrangement of the projectors PJ.

The projectors PJ first perform a setting action. All of the projectors PJ in the projection system 1 reset the amount of lens shift, the zoom ratio, and other parameters and project an adjustment image. The setting action may be performed when the projectors PJ are powered on.

Each of the projectors PJ in the projection system 1 then causes the imaging section 30 provided in the projector PJ to capture an image of the projection image. The amount of overlap of each of the overlapping projection areas OA is then detected. In a case where no overlapping projection area OA is produced, the projector that projects a projection image with no overlapping projection area OA projects information stating, for example, "The image does not overlap with another image. Adjust the position of the projector in such a way that the image overlaps with another image." That is, the projector that projects a project ion image with no overlapping projection area OA prompts the user to move the projector in such a way that the projection image overlaps with another projection image.

It is generally said that it is optimum that the overlapping projection area OA has a length about 10% of the lateral width of the area PA of a projection image projected by a projector. A projector that projects a projection image with a narrow overlapping projection area OA projects information stating, for example, "The amount of image overlap is small. Move the projector by **cm." to prompt the user to produce an optimum overlapping projection area OA.

The main projector then establishes connection with the other projectors in accordance with the projector list. Since the IP address of each of the projectors is known in the wireless LAN connection, the known IP address is used to carry out a connection process. In a case where projectors PJ in the projection system 1 have the same IP address assigned thereto, the main projector may project a projection image showing that there are projectors having the same IP address assigned thereto on the screen to prompt the user to change the IP address. Instead, only the projectors having IP addresses different from one another may each close the shutter in the projection section 20 to notify the user of the projectors having the same IP address. In either way, in the case where projectors PJ in the projection system 1 have the same IP address, the projectors PJ request the user to change the IP address in such a way that the projectors PJ do not have the same IP address.

An example of a method for detecting the arrangement order of the projectors PJ in the projection system 1 will next be described with reference to FIG. 5.

Figure 5:
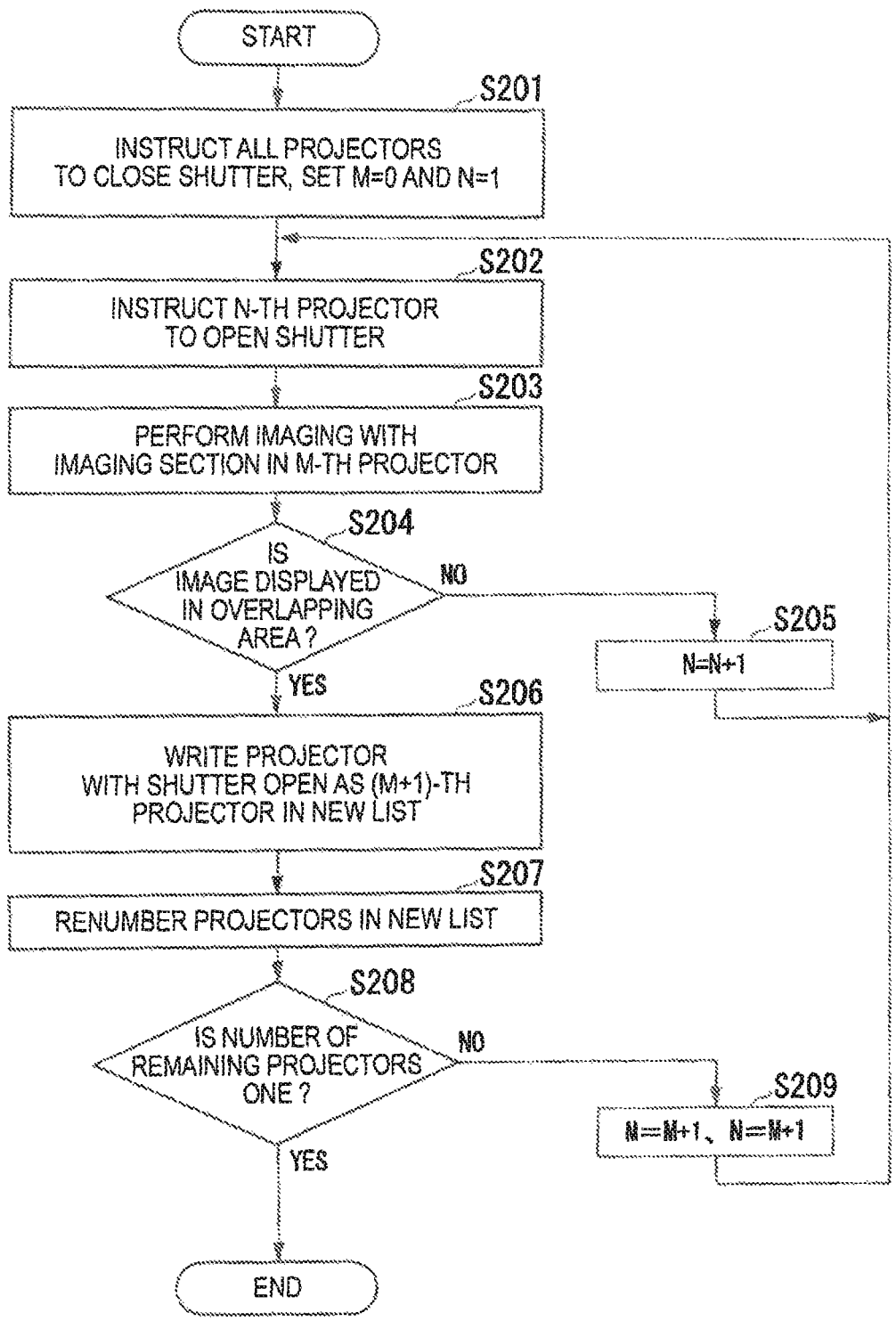
FIG. 5 is a flowchart of a method for detecting the arrangement order of the projectors in the projection system.

In the example shown in FIG. 5, it is assumed that a plurality of projectors are aligned with one another in the rightward/leftward direction and the leftmost projector is the main projector. At the start of the detection of the arrangement order, the main projector has no information on the arrangement order of the projector area.

The main projector recognizes the number of projectors to be connected to each other. The main projector can recognize the number of projectors by referring to the list. In the example shown in FIG. 4, the number of projectors to be connected to each other is five. Further, a number is assigned as the status to each of the projectors, as shown in the projector list. The number of 0, which is not in the list, is assigned to the main projector.

The main projector first instructs each of the other projectors to project a predetermined test image (all white image, for example) and close the shutter. Further, two variables M and N each representing the number of a projector are set, and the main projector substitutes 0 into the variable M and 1 into the variable N (step S201). In this state, since the shutters in all the projectors are closed, no test image is projected on the screen. The main projector then instructs the N-th projector to open the shutter (step S202). The imaging section 30 provided in the M-th projector is then used to capture an image of the screen (step S203). The main projector detects whether or not the test image is displayed in the overlapping projection area OA in the captured image (step S204). When no test image is displayed, the main projector instructs the N-th projector to close the shutter. The main projector increments the variable N (N=N+1, that is, increases N by 1) (step S205) and afterward repeats the processes in steps S202 to S204. In a case where the main projector detects that the test image is displayed in the overlapping projection area OA, the main projector determines that the N-th projector with the shutter open is adjacent to and on the right of the M-th projector having performed the imaging. The main projector reorganizes the projector list in such a way that the projector with the shutter open is written as the (M+1)-th projector in a new projector list (Step S206). Further, the main projector renumbers the projectors the positions of which have not been determined in the new projector list. Specifically, the main projector renumbers the projectors the positions of which have not been determined in such a way that M+2 and the following numbers are assigned to the projectors, and the main projector writes the renumbered projectors in the new projector list (step S207). The main projector evaluates whether or not the number of projectors the positions of which have not been determined is one (step S208). When the number of projectors the positions of which have not been determined is not one, the main projector increments the variable M (M=M+1, that is, increases M by 1) and substitutes the incremented variable M to which 1 is added into the variable N (N=M+1) (step S208). The main projector afterward repeats the processes in steps S202 to S208. When the number of projectors the positions of which have not been determined is one, the main projector terminates the process of detecting the arrangement order of the projectors PJ.

In the example described above, the method in which the main projector controls the other projectors to detect the arrangement order of the respective projectors PJ has been described. The arrangement order of the projectors PJ may instead be detected by using a method in which the main projector gives the right of detection of the order to the adjacent projector.

In the example described above, the shutter of each of the projectors PJ is opened and closed to allow detection of whether or not an adjacent projector is present, but this detection method is not necessarily employed. For example, a lens shift function of a projector PJ may be used to move an image rightward, leftward, upward, or downward to allow detection of an adjacent projector, or a projector PJ may enlarge or reduce a projection image to allow detection of an adjacent projector. That is, the main projector may cause the range over which a projector PJ projects a projection image to move and detect whether or not a projection image from another projector is displayed in the overlapping projection area OA to allow detection of an adjacent projector PJ. As described above, the main projector may sequentially cause each projector to shift a projection image therefrom and detect whether or not a projection image from another projector is displayed in the overlapping projection area OA to detect the order of the projectors PJ.

The above description has been made of the method for detecting the arrangement order of the projectors PJ by detecting whether or not a projection image is displayed in the overlapping projection area OA for each of the projectors PJ.

An example of the method for detecting the arrangement order of the projectors PJ in the projection system 1 by using a QR code (registered trademark) in which projector information is embedded (hereinafter referred to as identification image DC) will next be described with reference to FIG. 6.

Each of the projectors PJ has an identification image DC in which information on the projector (such as projector name and IP address) is embedded. The projector PJ projects the identification image DC provided therein via the projection section 20. The identification image DC is so set as to be projected on the upper or lower side of a right end portion of a projection image or on the upper or lower side of a left end portion of the projection image. That is, the identification image DC is projected in a peripheral portion of the projection image area that forms the overlapping projection area OA. The identification image DC may be projected at a plurality of locations or only one location in the peripheral portion of the projection image area.

Figure 6:
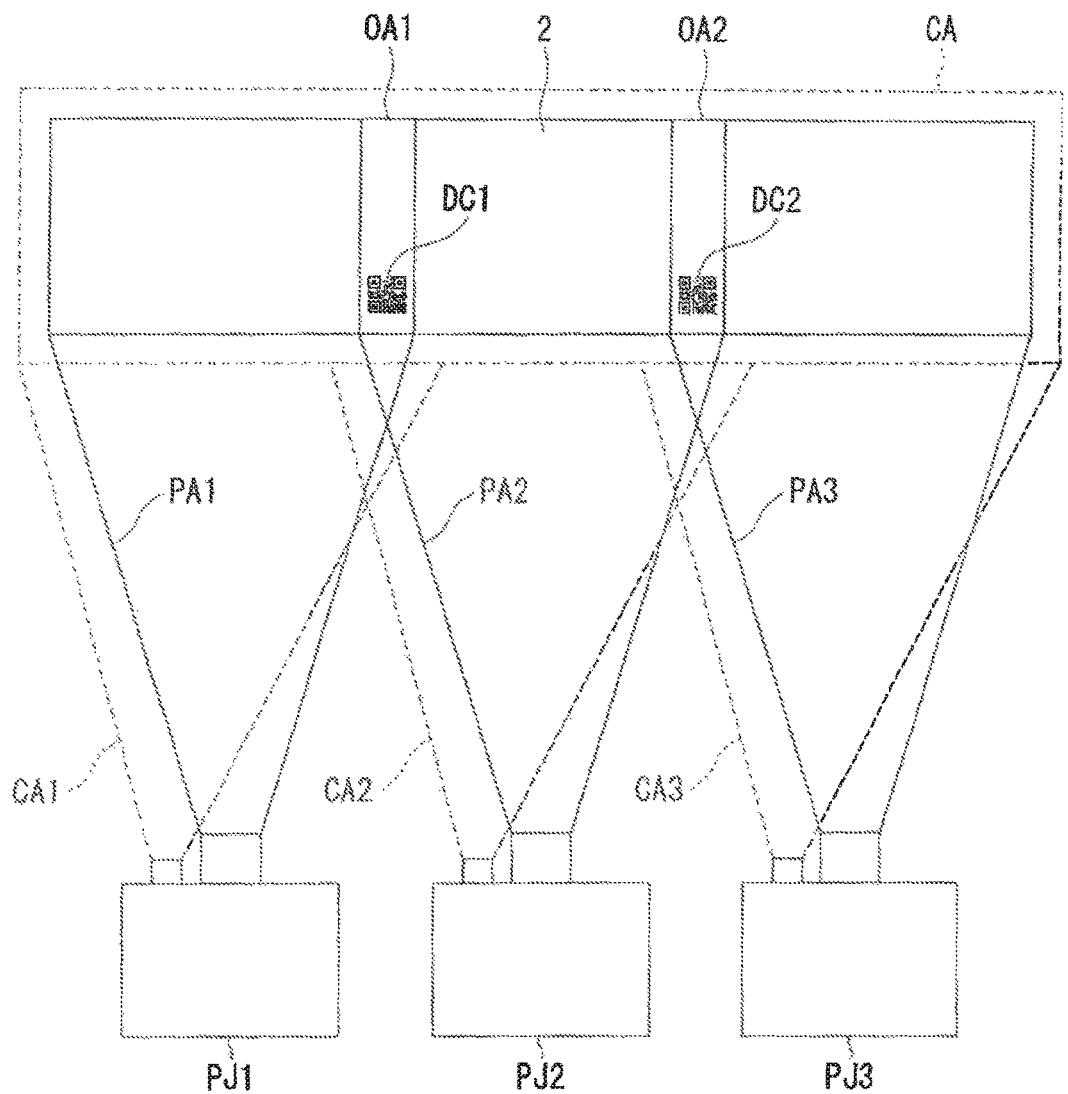
FIG. 6 shows that the projectors project identification images.

In FIG. 6, the leftmost projector PJ1 is the main projector. The main projector projects no identification image DC. The control section 10 provided in the projector PJ2 projects an identification image DC1 in a lower portion of the overlapping projection area OA1 or in a lower left portion of the projection image area PA2. The control section 10 provided in the projector PJ3 projects an identification image DC2 in a lower portion of the overlapping projection area OA2 or in a lower left portion of the projection image area PA3.

The control section 10 provided in the main projector first instructs the other projectors to project the identification images DC. The control sections 10 provided in the projectors having received the instruction project the identification images DC. The control section 10 provided in the main projector causes the imaging section 30 provided thereinto capture an image of the screen. The control section 10 provided in the main projector acquires the information on another projector from the identification image DC in the captured image. The control section 10 provided in the main projector establishes connection with the other projector via the communication section 80 on the basis of the acquired information on the other projector.

In a case where the control section 10 provided in the main projector recognizes that the identification image DC is present on the right, the control section 10 sets the projector that projects the recognized identification image DC to be N=1. The control section 10 provided in the main projector issues an instruction via the communication section to the projector set at N=1 to stop projecting the identification image DC. The control section 10 provided in the main projector uses, via the communication section 80, the imaging section 30 provided in the projector set at N=1 to read the identification image DC projected in the overlapping projection area OA. When the projector set at N=1 has successfully read the identification image DC, the control section 10 provided in the main projector acquires, via the communication section 80, projector information acquired from the identification image DC and establishes connection with the projector identified by the identification image DC on the basis of the acquired projector information. The control section 10 provided in the main projector sets, via the communication section 80, the projector identified by the identification image DC to be N=2. The control section 10 provided in the main projector issues an instruction, via the communication section 80, to the projector set at N=2 to stop projecting the identification image DC. The main projector afterward causes all the other projectors to sequentially carry out the same processes described above.

On the other hand, as a result of the action of the main projector in which it causes the imaging section 30 provided therein to capture an image of the screen and acquires information on another projector, when the main projector recognizes that the identification image DC is present in the left overlapping projection area OA, the main projector sets the projector that projects the recognized identification image DC to be N=−1. The control section 10 provided in the main projector issues an instruction, via the communication section 80, to the projector set at N=−1 to stop projecting the identification image DC. The control section 10 provided in the main projector uses, via the communication section 80, the imaging section 30 provided in the projector set at N=−1 to read the identification image DC. When the projector set at N=−1 has successfully read the identification image DC, the control section 10 provided in the main projector acquires, via the communication section 80, projector information acquired from the identification image DC and establishes connection with the projector identified by the identification image DC on the basis of the acquired projector information. The control section 10 provided in the main projector sets, via the communication section 80, the projector identified by the identification image DC to be N=−2. The control section 10 provided in the main projector issues an instruction, via the communication section 80, to the projector set at N=−2 to stop projecting the identification image DC. The main projector afterward causes all the other projectors to sequentially carry out the same processes described above.

After all the processes are completed, the main projector creates a list of the projectors in ascending order of N. The main projector can identify the arrangement order of the projectors PJ by creating the list of the projectors PJ in ascending order of N.

The main projector reassigns IP addresses to the other projectors on the basis of the newly created list. As a result, the projectors PJ used by the projection system 1 can be handled as one group. Further, the situation in which the same IP address is used by a plurality of projectors can be avoided. All the projectors PJ then project the adjustment image.

The identification image DC is not limited to a QR code (registered trademark) and may, for example, be a barcode or another identification code.

Figures 7, 8, 9:
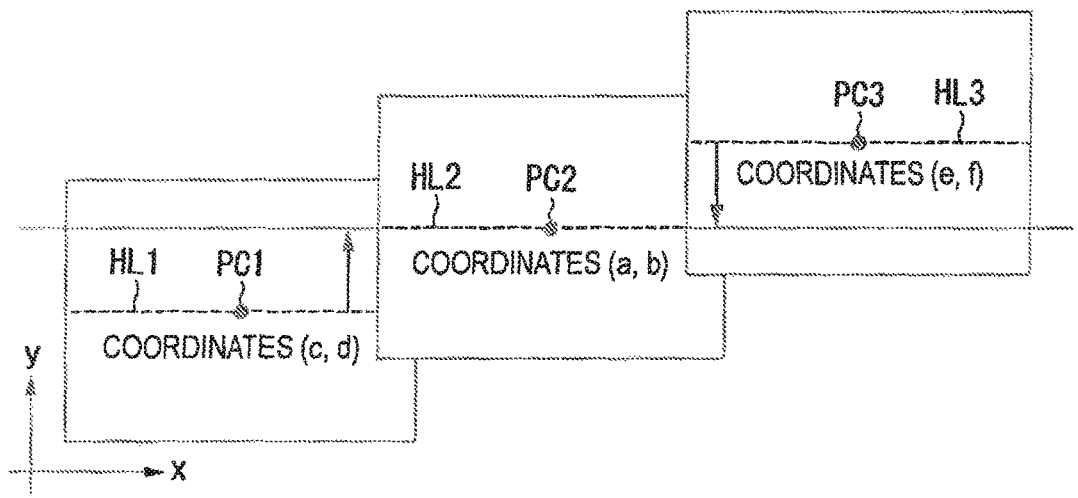
FIG. 7 shows an example of the list in a case where on the left of the main projector are arranged other projectors.
FIG. 8 shows an example of the list in a case where the main projector is located at the center and projectors are arranged on both sides of the main projector.
FIG. 9 shows an example of the arrangement of images captured by using imaging sections of the projectors.

An example of the list will next be shown with reference to FIGS. 7 and 8. FIG. 7 shows an example of the list in a case where on the left of the main projector are arranged other projectors PJ. In the list are recorded the status information, the projector name information, and the IP address information with the three pieces of information related to one another. Specifically, the list stores "−5" as the status information, "A" as the projector name information, and "0:0:0:1" as the IP address information with the three pieces of information related to one another. The list further stores "−4" as the status information, "B" as the projector name information, and "0:0:0:90" as the IP address information with the three pieces of information related to one another. The list further stores "−3" as the status information, "C" as the projector name information, and "0:0:0:40" as the IP address information with the three pieces of information related to one another. The list further stores "−2" as the status information, "D" as the projector name information, and "0:0:0:20" as the IP address information with the three pieces of information related to one another. The list further stores "−1" as the status information, "E" as the projector name information, and "0:0:0:70" as the IP address information with the three pieces of information related to one another.

FIG. 8 shows an example of the list in a case where the main projector is located at the center and projectors are arranged on both sides of the main projector. In the list are recorded the status information, the projector name information, and the IP address information with the three pieces of information related to one another. Specifically, the list stores "−2" as the status information, "A" as the projector name information, and "0:0:0:1" as the IP address information with the three pieces of information related to one another. The list further stores "−1" as the status information, "B" as the projector name information, and "0:0:0:90" as the IP address information with the three pieces of information related to one another. The list further stores "1" as the status information, "C" as the projector name information, and "0:0:0:40" as the IP address information with the three pieces of information related to one another. The list further stores "2" as the status information, "D" as the projector name information, and "0:0:0:20" as the IP address information with the three pieces of information related to one another. The list further stores "3" as the status information, "E" as the projector name information, and "0:0:0:70" as the IP address information with the three pieces of information related to one another.

As described above, since each of the projectors PJ includes the control section 10, the imaging section 30, and the communication section 80, the positions of the projectors PJ, which form the projection system 1, can be determined. A projector PJ projects the identification image DC containing information for connection with the projector PJ, and the imaging section 30 provided in another projector is used to capture an image including the identification image DC. Since the identification image DC contains information for connection with the projector having projected the identification image DC, the projector PJ can acquire the information on the projector having projected the identification image DC. Further, the control section 10 provided in the projector PJ can establish, via the communication section 80, connection with the projector having projected the identification image DC. The control section 10 provided in the projector PJ can further control, via the communication section 80, the other projector with which the projector PJ has established connection. The control section provided in the projector PJ can change, via the communication section 80, the IP address of the other projector with which the projector PJ has established connection.

Further, since the identification image DC is projected in the overlapping projection area OA, the main projector can detect the arrangement order of the projectors PJ.

In place of the main projector, a personal computer may be used to control the projectors PJ.

In this case, the personal computer is connected to the projectors PJ. The personal computer specifies one of the projectors PJ as a projector corresponding to the main projector. The personal computer controls the projector corresponding to the main projector to achieve the function described above.

Overview of First Embodiment

One example of the projection system according to the first embodiment relates to a projection system (projection system 1 in the example in the first embodiment) in which a plurality of projectors (projectors PJ in the example in the first embodiment) including a first projector (other projectors in the example in the first embodiment) and a second projector (main projector in the example in the first embodiment) project images (projection images in the example in the first embodiment) side by side. The first projector includes a first projection section (projection section 20 provided in each of the other projectors in the example in the first embodiment) that projects a first image (projection image projected from each of the other projectors in the example in the first embodiment) and a first control section (control section 10 provided in each of the other projectors in the example in the first embodiment) that causes the first projection section to project an identification image containing identification information (identification image DC in the example in the first embodiment), and the second projector includes a second projection section (projection section 20 provided in the main projector in the example in the first embodiment) that projects a second image (projection image projected from the main projector in the example in the first embodiment), an imaging section (imaging section 30 in the example in the first embodiment) that captures an image of a range including the projection range of the second projection section (area PA of a projection image projected by the projection section 20 provided in the main projector in the example in the first embodiment) to produce a captured image, and a second control section (control section 10 provided in the main projector in the example in the first embodiment) that causes the imaging section to capture an image of the identification image projected by the first projector, acquires the identification information on the first projector on the basis of the captured identification image, and determines the position of the first image relative to the second image on the basis of the position of the identification image in the captured image.

In the example of the projection system according to the first embodiment, the first control section causes the first projection section to project the identification image in such a way that the identification image is displayed in a peripheral portion (overlapping projection area OA1 or OA2 in the example in the first embodiment) of the projection range of the first projection section.

In the example of the projection system according to the first embodiment, the first projector includes a first communication section (communication section 80 provided in each of the other projectors in the example in the first embodiment), and the second projector includes a second communication section (communication section 80 provided in the main projector in the example in the first embodiment). The identification image contains connection information (projector name and IP address in the example in the first embodiment) for connection with the first projector. The second control section acquires the connection information on the basis of the captured identification image, and the second communication section establishes connection with the first communication section and performs communication therewith on the basis of the connection information acquired by the second control section.

In the example of the projection system according to the first embodiment, the second projector includes an address changing section (control section 10 provided in the main projector in the example in the first embodiment) that changes the address (IP address in the example in the first embodiment) of the first projector.

An example of the projector according to the first embodiment includes a projection section (projection section 20 in the example in the first embodiment) that projects a third image (projection image in the example in the first embodiment), an imaging section (imaging section 30 in the example in the first embodiment) that captures an image of a range including the projection range of the projection section to produce a captured image, and a control section that causes the imaging section to capture an image of an identification-information-containing identification image projected by another projector that projects an image in such a way that the image projected by the projector and the image projected by the other projector are arranged side by side, acquires the identification information on the other projector on the basis of the captured identification image, and determines the position of a fourth image (projection image in the example in the first embodiment) projected from the other projector relative to the third image on the basis of the position of the identification image in the captured image.

An example of the projector controlling method according to the first embodiment relates to a projector controlling method for controlling a projector including the projection section that projects the third image and the imaging section that captures an image of a range including the projection range of the projection section to produce a captured image, the method including causing the imaging section to capture an image of an identification-information-containing identification image projected by another projector that projects an image in such a way that the image projected by the projector and the image projected by the other projector are arranged side by side, acquiring the identification information on the other projector on the basis of the captured identification image, and determining the position of the fourth image projected from the other projector relative to the third image on the basis of the position of the identification image in the captured image.

Second Embodiment: Adjustment of Projection Screen Size

Each of the projectors PJ provided in the projection system 1 then adjusts the size of a projection image. The adjustment of the size of a projection image is typically performed by carrying out a fitting process of specifying a screen frame on the screen in advance and prompting the user to move the projector PJ or otherwise change the position thereof in such a way that a projection image fits in the pre-specified screen frame. However, a screen installed in an actual worksite is huge, and it is therefore difficult for the user to install the screen frame. It is instead be conceivable to form the screen frame on the screen in advance. In this case, however, after a projection image from each of the projectors PJ is fit in the screen frame, the screen frame needs to be removed. It is therefore difficult to employ the approach due to the extra effort. Further, since no screen frame can be attached in the first place, for example, in the case of projection mapping, adjustment of the projection position needs to be repeated in a trial-and-error manner. In view of the situations described above, in the projection system 1, the user specifies a rough screen size and roughly fits the size of a projection image to the screen size, followed by fine adjustment.

A method for causing the heights of projection images from the projectors PJ to agree with one another will be described with reference to FIG. 9.

The imaging section 30 provided in each of the projectors is used to capture an image of a projection image. Each of the projectors calculates the center of the captured projection image. The center of the projection image is also the center of the liquid crystal panel and coincides with the center of the optical axis. The main projector then sequentially acquires data on the projection image centers calculated by the other projectors. The main projector creates a list of the data on the acquired projection image centers.

The following description will be made by assuming that the projector located at the center is the main projector and the data on the center of the main projector is used as a height reference. The coordinates PC2 of the center of a projection image from the main projector are coordinates (a,b) in an xy coordinate system. The coordinates PC1 of the center of a projection image from the projector on the left of the main projector are coordinates (c,d) in the xy coordinate system. The coordinates PC3 of the center of a projection image from the projector on the right of the main projector are coordinates (e,f) in the xy coordinate system. Since the centers of the projection images projected from the projectors on the right and left of the main projector deviate from "b", which is the coordinate of the center coordinates PC2 in the height direction, height fitting correction is performed. The projection image from the projector on the left of the main projector is raised by correction data (b-d) toward the positive side in the y-axis direction. The projection image from the projector on the right of the main projector is so corrected as to be lowered by correction data (f-b) toward the negative side in the y-axis direction. In the height fitting correction method, the lens shift function of the projection section 20 provided in each of the projectors PJ is used to correct the projection position. In a case where the amount of correction data is greater than the lens shift range, the projector that needs to perform the height correction beyond the lens shift range projects a message stating "Beyond the amount of lens shift correction. Adjust the height of the projector body." on the screen. The user adjusts the height of the projector body. The projector performs the projection position correction again after the user completes the adjustment of the height of the projector body.

To calculate the correction data associated with a projection image, a horizontal line may be so drawn as to pass through the center of the projection images. Specifically, a horizontal line so drawn as to pass through the projection image center coordinates CP2 is a horizontal line HL2. A horizontal line so drawn as to pass through the projection image center coordinates CP1 is a horizontal line HL1. A horizontal line so drawn as to pass through the projection image center coordinates CP3 is a horizontal line HL3. In a case where the horizontal lines are not distinguished from one another, they are referred to as horizontal lines HL.

The opposite ends of each of the horizontal lines HL are so drawn as to be displayed in the overlapping projection areas OA. The main projector therefore causes the imaging section 30 provided in each of the projectors PJ to capture an image of the screen and analyzes the captured images to calculate correction data set on the basis of the amounts of shift of the horizontal lines HL.

By carrying out the process described above, the heights of the projection images from the projectors PJ are sequentially allowed to agree with one another by using the image from the main projector as a reference. Further, since the main projector compares the amount of lens shift with the correction data in the height fitting process, an error can be displayed in the case where position correction by an amount beyond the lens shift operation is attempted to be performed. The user can therefore be prompted to perform fine adjustment of the height of the projector body. Therefore, since the same process can be automatically carried out on all projectors managed as one group, the convenience for the user can be increased.

Figure 10:
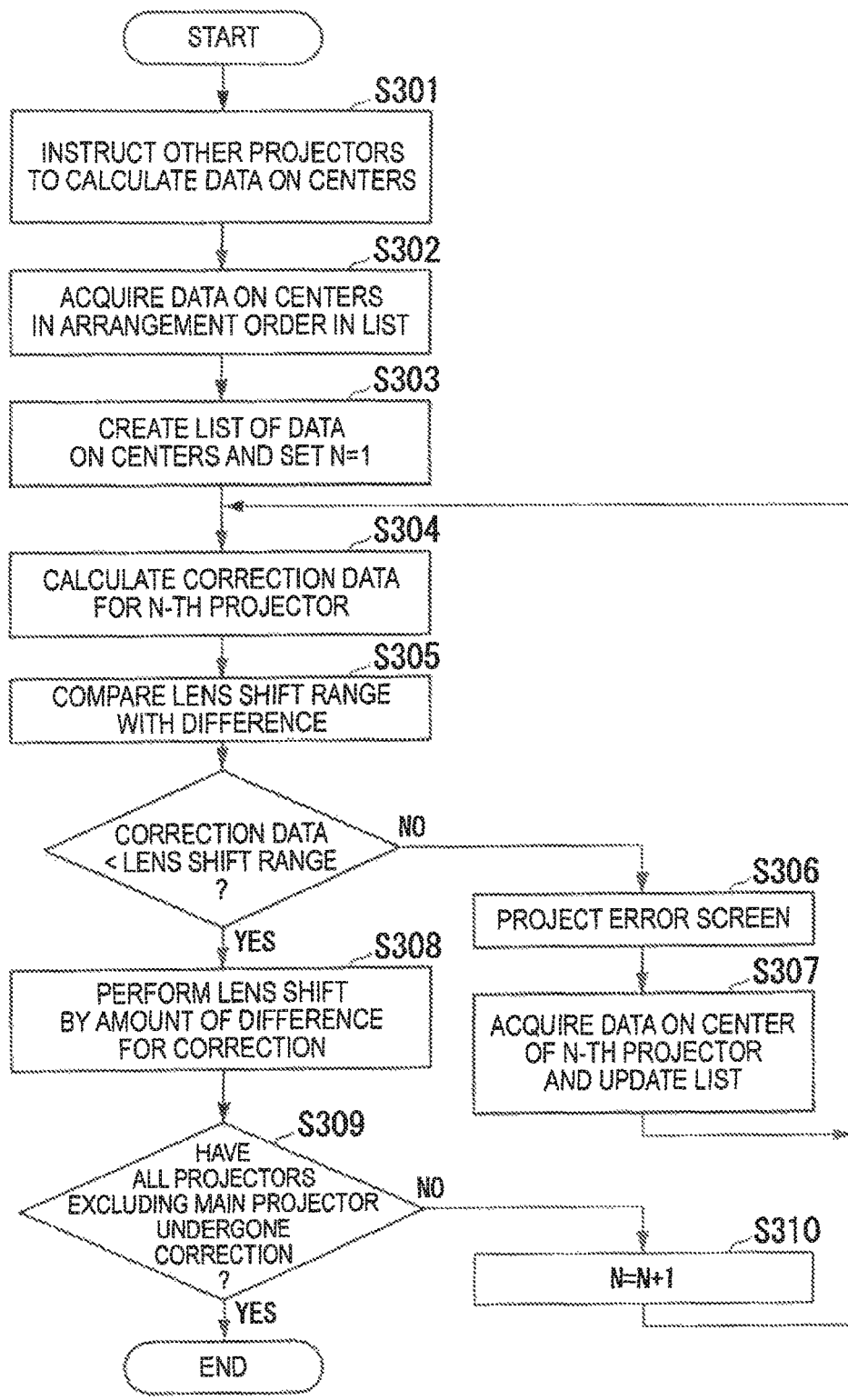
FIG. 10 shows an example of the procedure of causing the heights of images from the projectors to agree with one another.

The procedure of causing the heights of projection images from the projectors to agree with one another will next be described with reference to FIG. 10.

The main projector instructs the other projectors to calculate data on the centers of projection images (step S301). The main projector acquires the data on the centers of the projection images in the arrangement order of the projectors in the list (step S302). The main projector creates a list of the data on the centers of the projection images and sets the variable N at 1 (step S303). The main projector compares the height coordinate of the N—the projector in the list with the height coordinate of the center of the projection image from the main projector and calculates a difference between the height coordinates to calculate correction data (step S304). The main projector compares the lens shift range of the N-th projector with the correction data (step S305). In a case where the correction data for the N-th projector is greater than the lens shift range, the N-th projector projects an error screen stating "Beyond lens shift range. Adjust the height of the main body." (step S306). After the adjustment, the main projector causes the N-th projector to calculate the data on the center of the projection image again, acquires the data, and updates the list (step S307). The main projector repeats the processes in step S304 to S307 until the correction data becomes smaller than the lens shift range. Once the correction data is smaller than the lens shift range, the main projector causes the N-th projector to perform the lens shift by the correction data to correct the height of the projection image (step S308). The main projector checks whether or not all the projectors have undergone the correction, that is, whether the value of N is equal to the total number of other projectors (step S309). When the value of N is not equal to the total number of other projectors, the main projector increments the variable N (N=N+1, that is, increases N by 1) (step S310) and performs the correction on the following projector in the list. The main projector repeats steps S304 to S309 until the height of the projection image from the main projector coincides with the heights of the projection images from the other projectors. When the height adjustment of all the projectors is completed in step S309, the main projector terminates the process of causing the heights of the images from the projectors to agree with one another.

The user then uses a pointer that comes with a remote control of the each of the projectors to point at least two points to cause the main projector to transition to the function of adjusting the screen size. The pointer that comes with the remote control of a projector is the function that allows the user to project light having a point-like shape or any other shape from the remote control onto the screen. The light projected by the pointer does not necessarily have a point-like shape and may have a rectangular shape or an arrow-like shape.

The remote control does not necessarily project light. The user may use the remote control to input, to the corresponding projector PJ, coordinates that the user desires to specify. When the user specifies coordinates, the projector PJ may project a projection image combined with a mark onto the specified coordinates.

The function of adjusting the screen size by prompting the user to use the pointer to point at least two points is the function of causing a projector PJ to display a set inch value by prompting the user to use the pointer to indicate an area where the projector PJ performs projection. The user's indication performed by using the pointer is called specifying operation.

Figure 11:
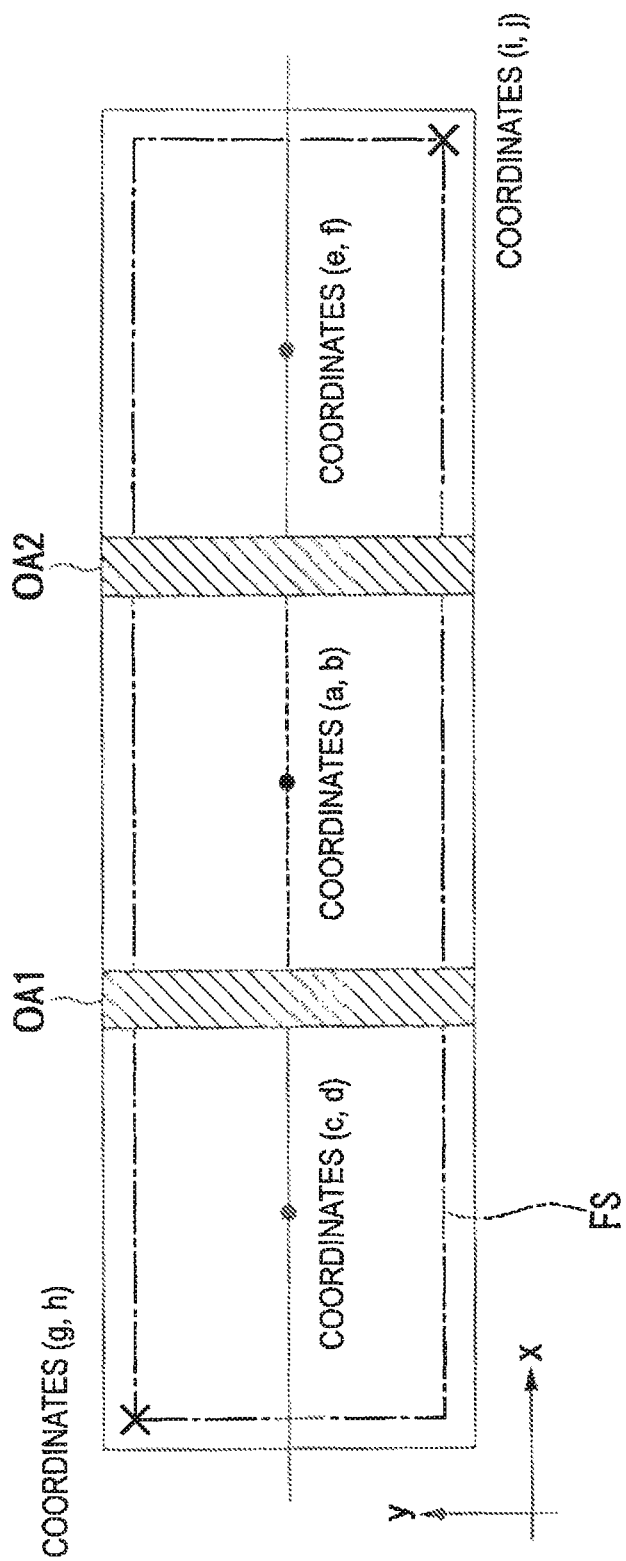
FIG. 11 shows an example of a pointer projected on a screen.

When a projector PJ transitions to the screen size setting function, the projector PJ projects a message stating "Use the pointer to point an upper left end and a lower right end that determine a desired screen size." The user uses the remote control, which is an attachment of the projector PJ, to specify the upper left end and the lower right end of an area where the user desires to project an image. The upper left end of the area where the user desires to project an image is coordinates (g,h) shown in FIG. 11. The lower right end of the area where the user desires to project an image is coordinates (i,j) shown in FIG. 11.

The operation detecting section 40 provided in the main projector, when it recognizes that the user has specified the upper left end or the lower right end of an area where the user desires to project an image, causes the imaging section 30 provided in each of the projectors PJ to capture an image of a projection image. Specifically, the main projector causes the imaging section 30 provided in each of the projectors PJ to successively capture an image of a projection image whenever the upper left end or the lower right end are specified and successively receives a captured image. The main projector then combines the captured images with one another. To combine the images with one another, the main projector focuses on the overlapping projection areas OA of the images and forms a single image by performing the combination in such a way that the overlapping projection areas OA coincide with each other.

The control section 10 provided in the main projector recognizes, from the single image that is the combination of the captured images, the upper left end and the lower right end of the area where the user desires to project an image and has indicated with the remote control. The main projector cooperates with the other projectors to project a frame (projection size frame FS) that surrounds the specified area.

Calculation of Temporary Screen Size

The main projector then calculates a temporary screen size.

Each of the projectors PJ first causes the distance measuring section 21 to measure the distance to the screen (projection distance). In the present example, data on the projection distance, data on the projector itself, and data on the projection lens are as follows.

As the data on the projector itself, $p_n$ represents the lateral width of the liquid crystal panel, and a represents the distance from the projection lens to the liquid crystal panel. As the data on the projection lens, $f_n$ represents the focal length (zoom value) of the projection lens. As the data measured by the projector PJ, $L_n$ represents the projection distance.

The projector PJ first calculates the size of a projection image in the lateral direction.

Let $m_n$ be the magnification in each of the projector, and the magnification $m_n$ can be determined by Expression (1). The reference character n shown in Expression (1) is a number assigned to the projector.

$$m_n = \frac{L_n - f_n}{f_n} \quad (1)$$

Since the lateral width $p_n$ of the liquid crystal panel multiplied by $m_n$ is the lateral width of the projection image, a lateral width $Z_n$ of the projection image can be determined by Expression (2).

$$Z_n = m_n p_n \quad (2)$$

Since the size of each pixel of the liquid crystal panel is known, the distance between the pixels can also be determined. The description will now be made by referring back to FIG. 1. Assuming that the number of projectors PJ is 3 (n=1, 2, and 3), the lateral size of the central projection image is $X_2$.

The lateral size of the overlapping projection area OA is expressed by $0.1X_2$.

The lateral size of the left-end projection image is expressed by Expression (3).

$$X_1 = (c - g) + \frac{z_1}{2} \quad (3)$$

The lateral size of the right-end projection image is expressed by Expression (4).

$$X_3 = (i - e) + \frac{z_3}{2} \quad (4)$$

On the basis of the above description, the lateral size X of the combined projection image is expressed by Expression (5). The width of each of the overlapping projection areas OA in the present embodiment is 10% of the lateral size X (X multiplied by 0.1).

$$X = X_1 + X_2 + X_3 - 0.1X_2 \times 2 \quad (5)$$

On the other hand, as for the size in the longitudinal direction, all the projectors PJ have undergone the height adjustment. The coordinates of the projection images in the height direction therefore agree with one another.

The longitudinal size Y of the combined projection images is expressed by Expression (6).

$$Y = h - j \quad (6)$$

On the basis of the above description, the temporary screen size S can be calculated by Expression (7).

$$S = \sqrt{X^2 + Y^2} \quad (7)$$

Since the overall lateral size of the projection images is known from the combined image, the control section 10 provided in the main projector converts the coordinates of each of the projectors PJ into combined image coordinates as system coordinates, for example, by using the coordinates of the left-end projector as a reference.

The control section 10 provided in the main projector transmits, via the communication section 80, data on the converted combined image coordinates to the projectors PJ to convert the coordinates of the projectors PJ into the combined image coordinates as the system coordinates. After the coordinate conversion is completed, the projectors PJ project an image having a size that is the combination of the calculated inch values. The user can therefore grasp the temporary screen size. Further, since the coordinate systems of the projectors can be unified to the single coordinate system, the projectors PJ can project a screen frame image that the user desires to project (hereinafter simply referred to as projection size frame).

Figure 12:
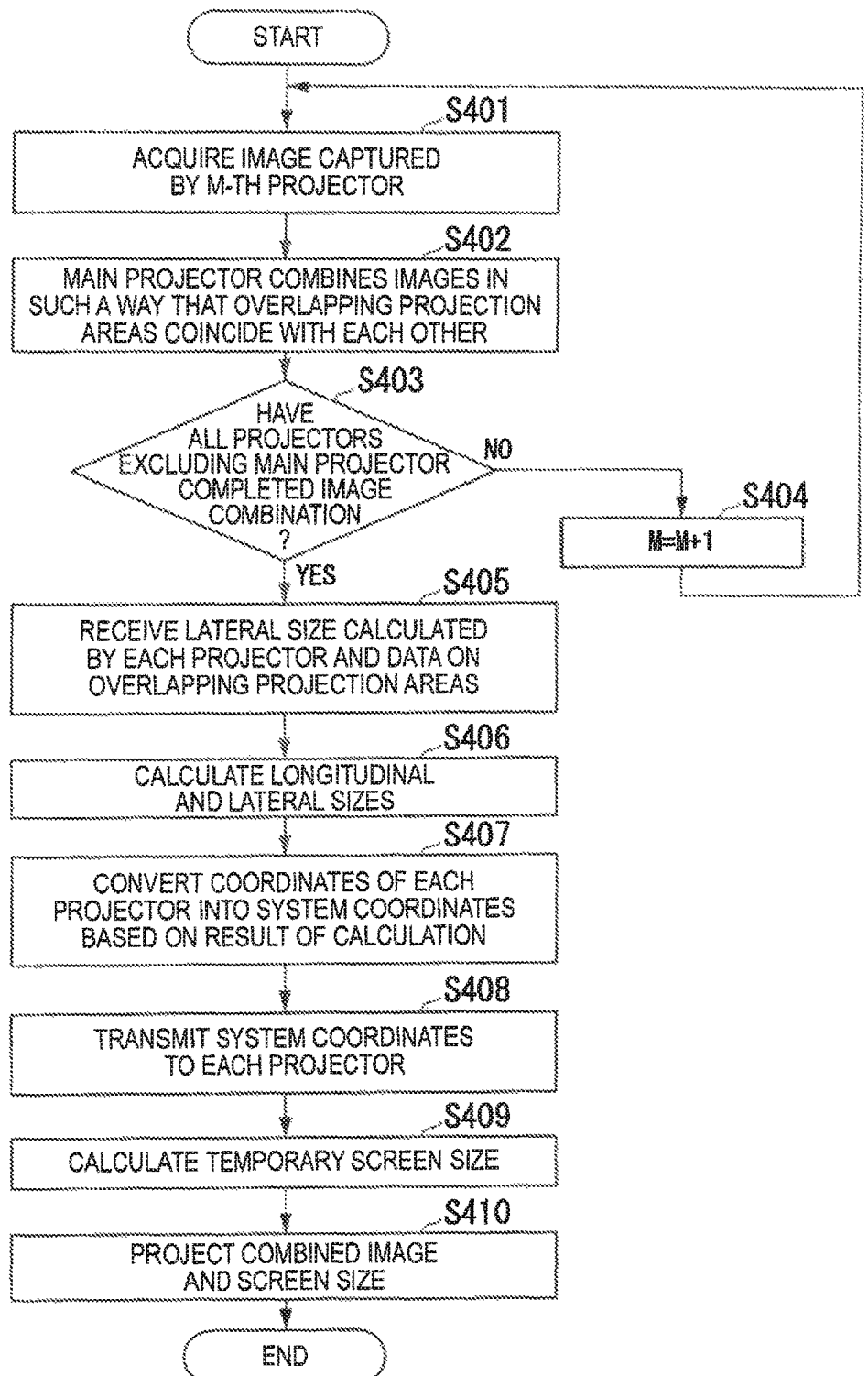
FIG. 12 is a flowchart of calculation of a temporary screen size.

A method for calculating the temporary screen size will next be described with reference to FIG. 12.

Let M be a variable representing a target projector. The initial value of the variable M is 1. The main projector acquires an image captured by the M-th projector in the list (step S401). The main projector combines the image captured by the M-th projector with the image captured by the main projector itself in such a way that the overlapping projection areas OA coincide with each other (step S402). The main projector evaluates whether or not images captured by all the other projectors have been combined (step S403). When the images captured by all the other projectors have not been combined, the main projector increments the variable M (M=M+1, that is, increases M by 1) (step S404), acquires an image captured by the following projector, and combines the captured image with the image combined previously. The main projector repeatedly carries out steps S401 to S403 until the images captured by all the other projectors are combined. In step S403, when the combination of the images captured by the other projectors is completed, the main projector receives the projection image lateral size calculated by each of the projectors and data on the overlapping projection areas OA (step S405). The calculation section 50 provided in the main projector calculates the longitudinal and lateral sizes of the projection image from the combined captured image (step S406). The calculation section 50 provided in the main projector converts the coordinates of the projectors PJ into the system coordinates on the basis of the calculated longitudinal and lateral sizes (step S407). The main projector transmits the system coordinates to the other projectors PJ (step S408). The calculation section 50 provided in the main projector calculates the temporary screen size (step S409). The projectors PJ project the combined image and the screen size (step S410).

Perform Fine Adjustment to Correct Temporary Screen Size to Desired Size

In a best-case scenario, the user's specifying operation leads to a desired screen size, but the user desires in practice to perform fine adjustment on the temporary screen size in some cases. To this end, the projectors PJ transition to a fine size adjustment mode after they display the screen size.

Figure 13:
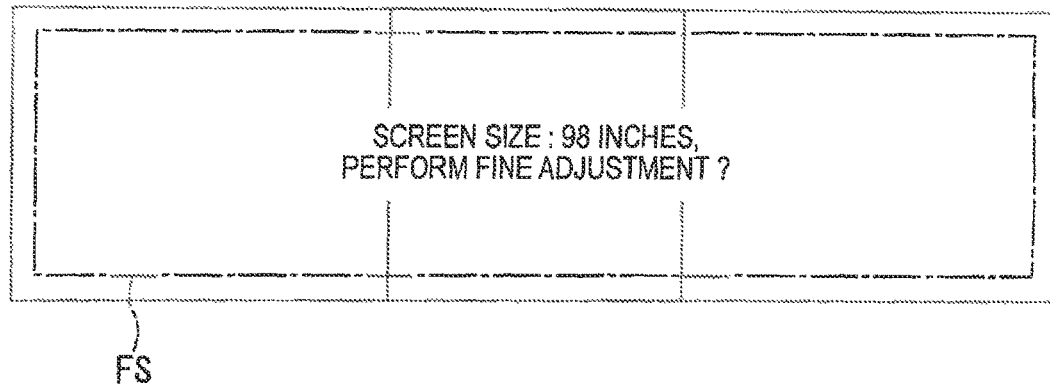
FIG. 13 shows an example of a screen for inquiring of a user whether or not fine adjustment is performed on the screen size.

The projectors PJ project a message stating "Perform fine adjustment onscreen size?" as shown in FIG. 13 to inquire whether the user desires to perform fine adjustment. In a case where the user determines to perform fine adjustment, the projectors PJ enter the fine adjustment mode. In a case where the user determines to perform no fine adjustment, the projectors PJ determine the screen size presented before to be the screen size to be displayed. The projectors PJ then transition to a tiling mode.

In the present embodiment, the description has been made by assuming that the aspect ratio of a projection image has been determined in advance. In a case where the user desires to change the aspect ratio, the user can select "change aspect ratio" in a menu screen displayed on the main projector to switch the aspect ratio to any other value. In the present embodiment, the description will be made of a case in which the user does not set the aspect ratio from the menu screen displayed on the main projector but adjusts the screen size on the basis of the ratio between the current inch values and a case in which the user uses the aspect ratio to adjust the screen size.

Figure 14:
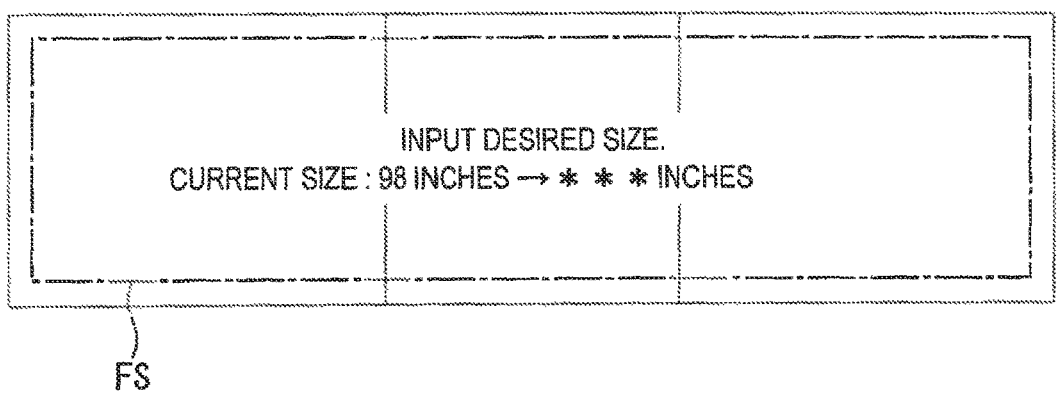
FIG. 14 shows an example of a projection screen into which the user inputs a desired inch size.

The projectors PJ project a screen for prompting the user to input a desired inch size, as shown in FIG. 14. When the user inputs an inch size, the user may input a desired inch size by using the remote control or by using an upward/downward button and a rightward/leftward button provided on the remote control or the input section 60 of any of the projectors to select any of values set in a numeral field and a digit field. The method described above is not necessarily employed, and the user only needs to be capable of inputting a desired inch size into any of the projectors PJ.

Case in which Inch Adjustment is Performed Based on Ratio Between Current Inch Values Let RS be an inch value inputted by the user. The temporary screen size is determined by the longitudinal size Y and the lateral size X. Therefore, to maintain the initial ratio, the longitudinal size Y and the lateral size X may be multiplied by the same magnification factor a. To this end, the main projector may calculate the magnification factor a.

On the basis of the desired inch size as well as the longitudinal size Y and the lateral size X, the magnification factor a is calculated by Expressions (8) and (9).

$$RS = \sqrt{(aX)^2 + (aY)^2} = a\sqrt{X^2 + Y^2} \quad (8)$$

Expression (9) is derived from Expression (8). The main projector can calculate the magnification factor a from Expression (9).

$$a = \frac{RS}{\sqrt{X^2 + Y^2}} \quad (9)$$

On the basis of the above description, to change the inch size in the longitudinal direction, the upper left end pointer coordinates (g,h) is changed to new pointer coordinates (g, (a−1)(h−j)+h) in a case where the lower coordinates are used as a reference. Similarly, to change the inch size in the lateral direction, the lower right end pointer coordinates (g+X,j) (coordinates after conversion into system coordinates) are changed to new pointer coordinates ((a−1)X+(g+X),j) in a case where the left coordinates are used as a reference.

An example of a screen for checking the projection size after the change will be described with reference to FIG. 15.

The image changing section 70 provided in the main projector changes the projection size frame FS on the basis of the projection size after the change calculated by the calculation section 50 provided in the main projector. The image changing section 70 supplies the control section 10 with a projection size frame FC after the change.

The projectors PJ project the projection size frame FS before the change and the projection size frame FC after the change. The main projector PJ inquires of the user whether the projection size after the change may be set as the projection image size. In a case where the user accepts the projection size after the change, the user selects an option representing that the projection size after the change may be set. The main projector sets the projection size to be the projection size after the change. In a case where the user does not accept the projection size after the change, the user selects an option representing that the projection size after the change should not be set. In the case where the user selects the option representing that the projection size after the change should not be set, the main projector carries out the process of setting the projection size again.

Figure 15:
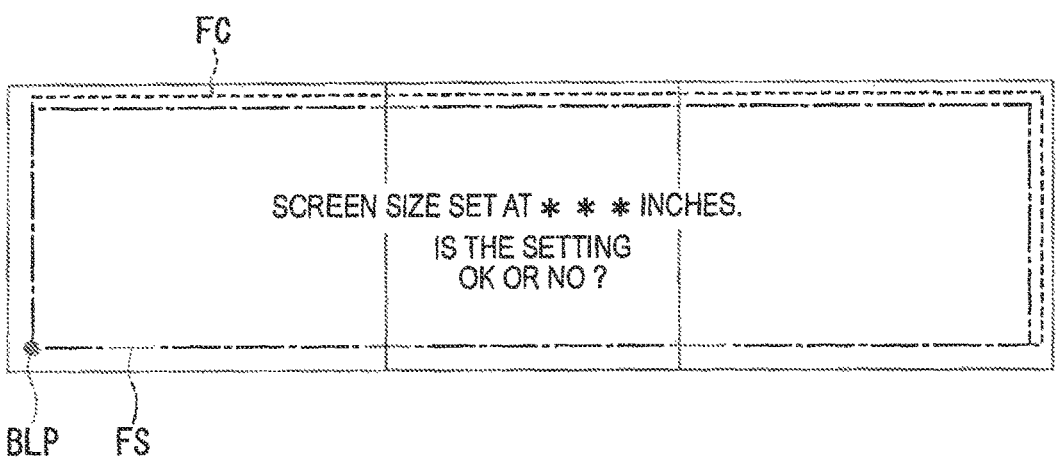
FIG. 15 shows an example of a screen for checking a changed projection size.

In this example, the projection size is changed by using the lower left end BLP of a projection image as a reference, as shown in FIG. 15. The projection size may instead be increased equally in the upward/downward direction and the rightward/leftward direction by using the projection image center coordinates (a,b) shown in FIG. 11 as a reference. The reference used to change the projection size is not limited to the lower left end BLP of a projection image or the projection image center coordinates described above and may be a point that falls within the projection image range.

Figure 16:
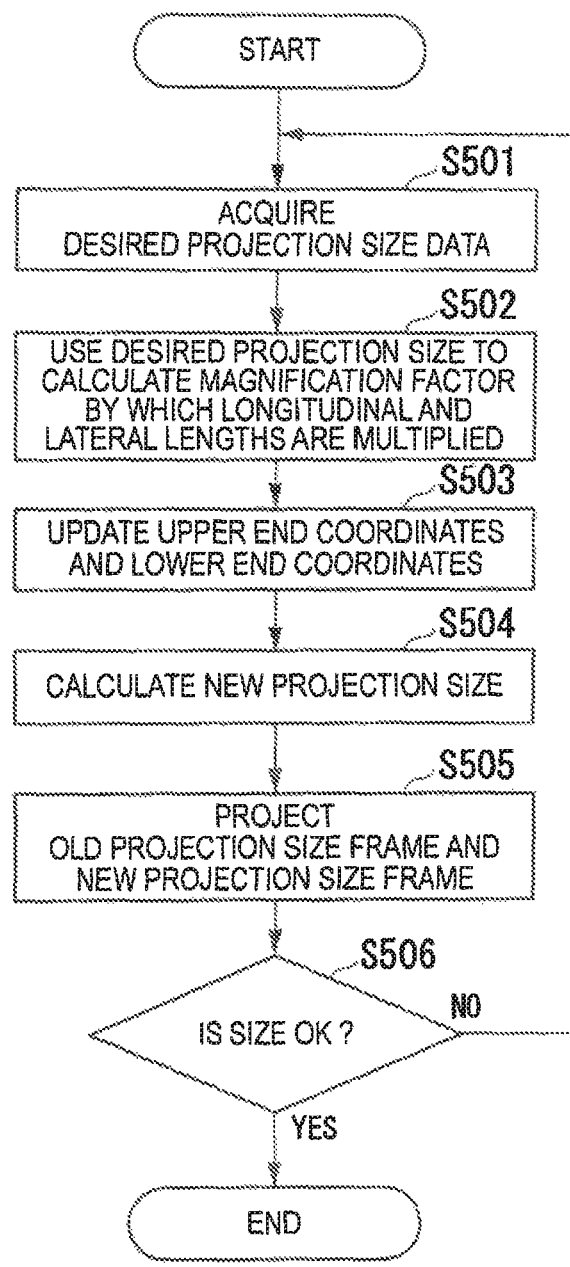
FIG. 16 is a flowchart of the procedure in which a projector in the projection system changes the projection size.

An example of the procedure in which the projection system 1 changes the projection size will next be described with reference to FIG. 16.

The main projector acquires a projection size desired by the user via the input section 60 provided in the main projector (step S501). The calculation section 50 provided in the main projector uses the projection size desired by the user to calculate a magnification factor by which the longitudinal and lateral lengths of the projection size are multiplied (step S502). The control section 10 provided in the main projector updates the upper left end coordinates and the lower right end coordinates of the projection size (step S503). The image changing section 70 provided in the main projector changes the projection size frame FS before the change to the projection size frame FC after the change on the basis of a result of the calculation performed by the calculation section 50 (step S504). The main projector cooperates with the other projectors to project the projection size frame FS before the change and the projection size frame FC after the change desired by the user (step S505). The main projector inquires of the user whether the projection size after the change may be set. In a case where the user selects the option representing that the projection size after the change is not set (NO), the main projector returns to step S501 and carries out the following steps again. In the case where the user selects the option representing that the projection size after the change is set (YES), the main projector updates the projection size and terminates the projection size changing procedure (step S506).

A method for adjusting the projection size by using of the aspect ratio will next be described. The aspect ratio is assumed to be determined by a lateral projection size AW and a longitudinal projection size AH. The temporary screen size is determined by the longitudinal size Y and the lateral size X, and an inputted inch size of a projection image is RS, as described above.

The longitudinal and lateral lengths of the projection size to be set are as follows.

Lateral length to be set: X+α

Longitudinal length to be set: Y+β

On the basis of the inch value of the projection size desired by the user, the longitudinal length Y+β to be set, and the lateral length X+α to be set, the inch size of a projection image can be calculated by Expression (10).

$$RS = \sqrt{(X+\alpha)^2 + (Y+\beta)^2} \quad (10)$$

On the other hand, since the aspect ratio is AW:AH, Expression (11) is derived.

$$AW:AH = X+\alpha:Y+\beta \quad (11)$$

Expression (11) is deformed into Expression (12).

$$Y + \beta = \frac{AH}{AW}(X + \alpha) \quad (12)$$

To determine the length α to be added to the lateral length, Expression (12) is substituted into the inch value calculation formula expressed by Expression (10). Expression (10) can be deformed into Expression (13).

$$RS = \sqrt{(X+\alpha)^2 + \left\{\frac{AH}{AW}(X+\alpha)\right\}^2} = \quad (13)$$

$$(X+\alpha)\sqrt{1 + \left(\frac{AH}{AW}\right)^2} = \frac{\sqrt{AW^2 + AH^2}}{AW}(X+\alpha)$$

The length α to be added to the lateral length can therefore be calculated by Expression (14).

$$\alpha = \frac{AW}{\sqrt{AW^2 + AH^2}} RS - X \quad (14)$$

Similarly, the length β to be added to the longitudinal length can be calculated by deforming Expression (15) into Expression (16).

$$RS = \sqrt{\left\{\frac{AW}{AH}(Y+\beta)\right\}^2 + (Y+\beta)^2} = \quad (15)$$

$$(Y+\beta)\sqrt{\left(\frac{AW}{AH}\right)^2 + 1} = \frac{\sqrt{AW^2 + AH^2}}{AH}(Y+\beta)$$

$$\beta = \frac{AH}{\sqrt{AW^2 + AH^2}} RS - Y \quad (16)$$

Since the lateral and longitudinal lengths to be set have been calculated, the main projector may calculate the upper left end coordinates and the lower right end coordinates by using the left end and the lower side of the projection image range as a reference, as in the method described above. The size may instead be increased equally in the upward/downward direction and the rightward/leftward direction by using the center of the projection screen as a reference.

The main projector then projects the projection size frame FS before the change and the projection size frame FC after the change. The main projector inquires of the user whether the projection size after the change may be used to set the projection size. In a case where the user accepts the setting of the projection size, the user selects the option representing that the projection size after the change is used. The main projector determines the projection image range to be the projection size after the change. In a case where the user does not accept the setting of the projection size, the user selects the option representing that the projection size after the change is not used. In a case where the user selects the option representing that the projection size after the change is not used, the main projector carries out the process of setting the projection size again.

Each of the projection size frame FS before the change and the projection size frame FC after the change described above is not limited to a frame image and may be any image that allows the user to recognize the boundary of the projection image range.

Perform Automatic Tiling

In the above description, since a projection size desired by the user can be determined, the projectors PJ correct projection images in such a way that they fit in the projection size. The correction of projection images in such a way that they fit in the projection size may be performed by using any method. For example, a known method may be used.

The projectors PJ simultaneously carry out the process of blending the overlapping projection areas OA with the projection images in such a way that no unevenness or other undesirable effects in the projection images occur. The process of preventing unevenness in the projection images may be carried out by using any method. For example, a known process may be used.

As described above, since each of the projectors PJ includes the control section 10, the projection section 20, the imaging section 30, the operation detecting section 40, the calculation section 50, the input section 60, the image changing section 70, and the communication section 80, the range of projection images from the projectors PJ, which form the projection system 1, can be readily specified. The main projector establishes connection with the other projectors via the communication section 80 provided in the main projector. The operation detecting section 40 provided in each of the projectors PJ can detect the user's specifying operation of specifying an arbitrary projection image range. The input section 60 provided in each of the projectors PJ allows the user to specify an arbitrary inch size of a projection image. The main projector, when the specifying operation is detected, causes the imaging section 30 provided in each of the projectors PJ to capture an image of the screen. The main projector acquires the projection image range specified by the user from the captured images. The calculation section 50 provided in each of the projectors PJ unifies the coordinate systems in the projectors PJ into a single coordinate system and calculates a projection size after the change on the basis of the projection image range specified by the user. The image changing section 70 provided in each of the projectors PJ changes the projection size frame FS before the change to the projection size frame FC after the change on the basis of the projection size after the change. The projectors PJ project the projection size frame FS before the change and the projection size frame FC after the change. The user can accept or reject the option representing that the size of projection images projected by the projectors PJ is set to the size represented by the projection size frame FC after the change. The configuration described above allows the user to readily set a projection image having a desired projection size in each of the projectors PJ. The position indicated by the user's specifying operation is not necessarily the upper left end or the lower right end described above, and any positions that allow the user to recognize opposite angles of the projection image area may be specified.

In place of the main projector, a personal computer may be used to control the projectors PJ. In this case, the personal computer is connected to the projectors PJ. The personal computer specifies one of the projectors PJ as a projector corresponding to the main projector. The personal computer controls the projector corresponding to the main projector to achieve the function described above.

Overview of Second Embodiment

One example of the projection system according to the second embodiment relates to a projection system (projection system 1 in the example of the second embodiment) which includes a plurality of projectors (projectors PJ in the example of the second embodiment) and a control apparatus (main projector in the example of the second embodiment) and in which the plurality of projectors project images arranged alongside of one another. Each of the plurality of projectors includes a projection section (projection section 20 provided in each of the projectors PJ in the example of the second embodiment) that projects an image (projection image in the example of the second embodiment) on a projection surface (screen in the example of the second embodiment), an imaging section (imaging section 30 provided in each of the projectors PJ in the example of the second embodiment) that captures an image of a range including the projection range of the projection section (projection image range in the example of the second embodiment) to produce a captured image, and an operation detecting section (operation detecting section 40 in the example of the second embodiment) that detects, on the basis of the captured image, specifying operation of specifying an image display range over which the plurality of projectors display the images on the projection surface. The control apparatus includes a control section (control section 10 in the example of the second embodiment) that determines the image display range on the basis of the specifying operation detected by the operation detection section of each of the plurality of projectors.

In the example of the projection system according to the second embodiment, the control apparatus includes a calculation section (calculation section 50 in the example of the second embodiment) that calculates the size of the image display range on the projection surface, and the control section causes at least one of the plurality of projectors to project information representing the size calculated by the calculation section via the projection section.

In the example of the projection system according to the second embodiment, the control section causes each of the plurality of projectors to project a frame image (projection size frame in the example of the second embodiment) representing the image display range via the projection section.

In the example of the projection system according to the second embodiment, the control apparatus includes an input section that accepts an input of the size of the image display range and an image changing section (image changing section 70 in the example of the second embodiment) that changes the frame image on the basis of the size accepted by the input section, and the control section causes each of the plurality of projectors to project a frame image changed by the image changing section via the projection section.

In the example of the projection system according to the second embodiment, the specifying operation is operation of specifying at least one point within the frame of the image display range.

One example of the projector according to the second embodiment includes a projection section that projects a first image on a projection surface, an imaging section that captures an image of a range including the projection range of the projection section to produce a captured image, and an operation detecting section that detects, on the basis of the captured image, in a case where a plurality of projectors including the projector and other projectors project images arranged alongside of one another, specifying operation of specifying an image display range over which the plurality of projectors display the images on the projection surface, and the projection section projects the first image over the image display range determined on the basis of the specifying operation detected by the operation detecting section.

One example of the projector controlling method according to the second embodiment relates to a projector controlling method for controlling a projector including a projection section that projects an image on a projection surface, an imaging section that captures an image of a range including the projection range of the projection section to produce a captured image, and an operation detecting section that detects, on the basis of the captured image, in a case where a plurality of projectors including the projector project images arranged alongside of one another, specifying operation of specifying an image display range over which the plurality of projectors display the images on the projection surface, and the image display range is determined on the basis of the specifying operation detected by the operation detecting section.

Third Embodiment: Backup Function

The above description has been made of preparation for projection of tiled images from the projectors PJ. A backup function provided by the present embodiment will next be described.

In an actual worksite, a trouble resulting from a lost projection image occurs in some cases due to a burned-out lamp in a projector PJ. Further, in an actual worksite, a trouble resulting from a disordered projection image occurs in some cases due to failure of a projector PJ.

Figure 17:
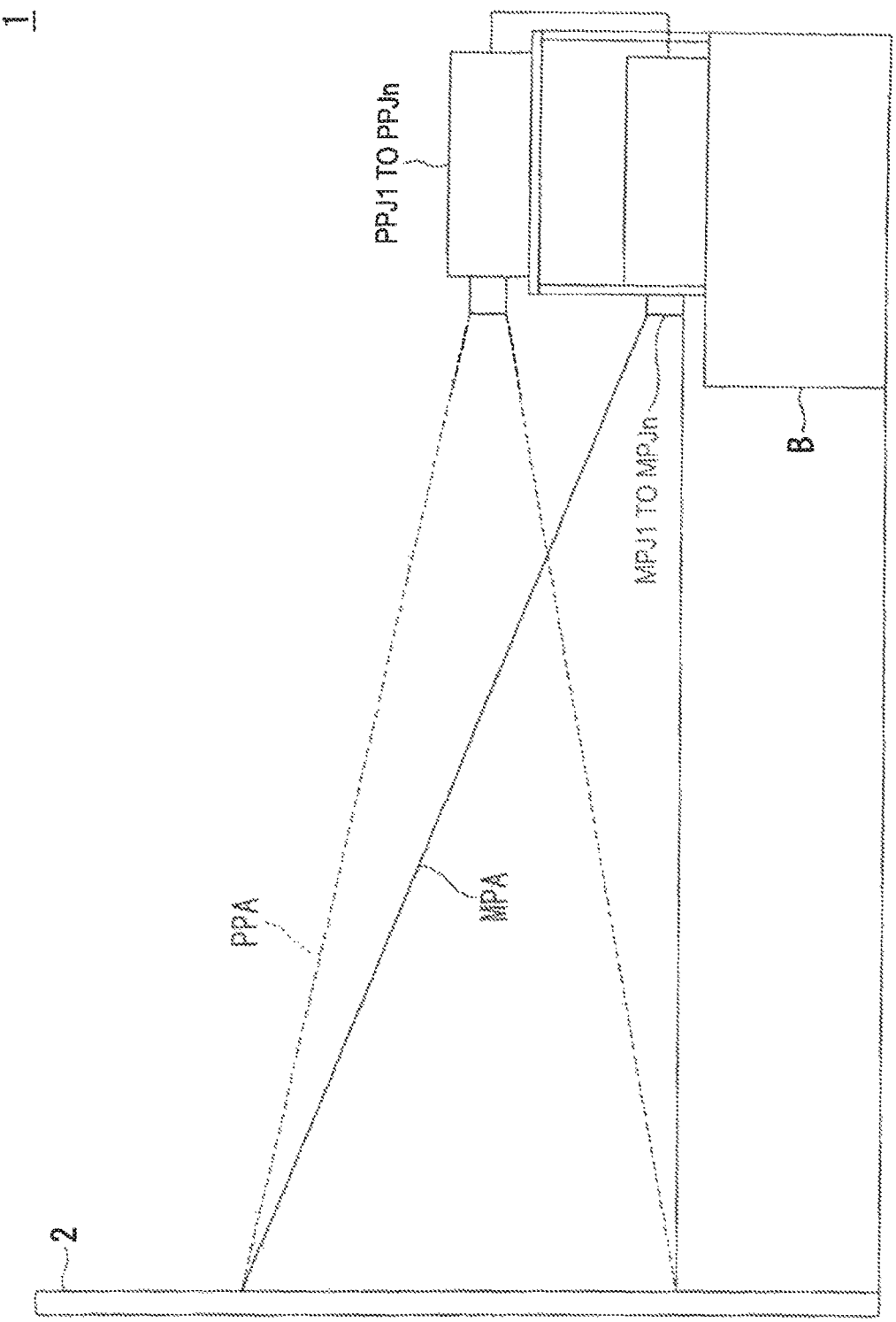
FIG. 17 shows an example of a backup configuration of the projection system.

To avoid the circumstances described above, in the present embodiment, the projection system 1 is provided with not only a set of first projectors MPJ but also a set of second projectors PPJ, which are backup projectors, as shown in FIG. 17. The set of first projectors MPJ specifically includes a first projector MPJ1 to a first projector MPJn. The set of second projectors PPJ specifically includes a second projector PPJ1 to a second projector PPJn. The reference character n is an integer equal to or greater than 1. Each of the set of the first projectors MPJ and the set of the second projectors PPJ includes n projectors.

The first projection projectors MPJ are disposed on an installation table B. The first projection projectors MPJ perform projection over a projection image range MPA. The second projectors PPJ are installed at a level above the first projection projectors MPJ. The second projectors PPJ perform projection over a projection image range PPA. The projection image range MPA and the projection image range PPA are the same projection range.

In a case where a projector-related trouble occurs in any of the first projectors MPJ, the user manually and quickly opens the shutter in the backup projector PPJ installed in a position above or below the projector having experienced the projector-related trouble to handle the projector-related trouble. However, since the point of time when the lamp of a projector is burnt out is unknown, the user's manual operation in response to a burnt-out lamp is quite burdensome.

If a projector-related trouble occurs in any of the first projectors MPJ and the lamp of the corresponding one of the second projectors PPJ is then turned on, it takes time to start image projection, and the audience undesirably notices the projector-related trouble.

To avoid such a situation, each of the second projectors PPJ is in a standby state in which the lamp is turned on and the same image projected by the corresponding first projector MPJ is ready to be projected but the light blocking device 91 closes the shutter. When a projector-related trouble occurs in any of the first projectors MPJ, the corresponding one of the second projectors PPJ causes the light blocking device 91 to open the shutter so that the projection image can be immediately projected.

To this end, in the projection system 1, when the abnormality detecting section 90 senses that an abnormality occurs in any of the first projectors MPJ, a signal is immediately transmitted to the corresponding second projector PPJ, which is a backup projector. The light blocking device 91 provided in the second projector PPJ having received the signal has a shutter open control configuration.

For example, the second projectors PPJ, which are backup projectors, are so disposed as to correspond to the respective first projectors MPJ. Specifically, the second projector PPJ1, which projects a projection image in the same position where the first projector MPJ1 projects a projection image, is provided. Further, the second projector PPJ2, which projects a projection image in the same position where the first projector MPJ2 projects a projection image, is provided. Each of the first projector MPJ and the second projector PPJ only needs to be so disposed as to project projection images in the same position, and the number of the projectors is not limited to two.

The communication section 80 provided in each of the first projectors MPJ is connected to the communication section 80 provided in the corresponding one of the second projectors PPJ, which are backup projectors, via a communication line. Each of the first projectors MPJ has an emergency list table, such as that shown in FIG. 18. FIG. 18 is an example of the emergency list table. For example, in the emergency list table are set an input signal detection abnormality, a projector temperature abnormality (high temperature), a lamp voltage abnormality (burnt-out lamp), a fan out-of-order abnormality, a lamp cover open abnormality, and a power supply abnormality. The abnormality states set in the emergency list table are not those described above.

The abnormality detecting section 90 provided in each of the first projectors MPJ monitors whether any of the states set in the emergency list table has occurred. When the abnormality detecting section 90 provided in any of the first projectors MPJ detects that any of the states set in the emergency list table has occurred in the first projector MJP, the first projector MPJ transmits an emergency signal to the corresponding second projector PPJ, which is a backup projector. The emergency signal contains a shutter open instruction. The backup second projector PPJ having received the emergency signal causes the light blocking device 91 provided therein to open the shutter.

The abnormality detecting section 90 provided in each of the first projectors MPJ automatically detects any of the abnormalities set in the emergency list table and activates the corresponding second projector PPJ, which is a backup projector. The user therefore does not need to keep staying by for an emergency event, and a backup second projector PPJ can instantaneously project an image.

An example of the backup mechanism has been described above, but the backup operation can be performed in two ways.

In a first method, when a trouble occurs in any of the first projectors MPJ, which are separately arranged from each other, the second projector PPJ paired with the first projector MPJ having experienced the trouble individually handles the trouble. Specifically, the first projector MPJ1 is connected to a second projector PPJ1 paired therewith. The first projector MPJ1 may be so configured that when the abnormality detecting section 90 provided in the first projector MPJ1 detects an abnormality, the first projector MPJ1 transmits the emergency signal to the second projector PPJ1. When the communication section 80 provided in the second projector PPJ1 receives the emergency signal, the second projector PPJ1 causes the light blocking device 91 provided therein to open the shutter and performs projection on the screen. The first projector MPJ1 having experienced the trouble stops performing projection. To stop performing projection, the first projector MPJ1 having experienced the trouble may cause the light blocking device 91 provided therein to close the shutter, or the first projector MPJ1 itself may stop operating.

As described above, in the first method, since only a projector having experienced an abnormality is switched to the backup projector, the control is advantageously simple.

In a second method, when the abnormality detecting section 90 of any one of the first projectors MPJ detects an abnormality, all the first projectors MPJ are caused to stop operating, and all the second projectors PPJ, which are backup projectors, handle the trouble. Specifically, when any one of the first projectors MPJ experiences a trouble, the first projector MPJ having experienced the trouble transmits an emergency signal via the communication section 80 to the main projector. The main projector transmits a shutter opening emergency signal to all the second projectors PPJ, which are backup projectors. The main projector further transmits a shutter closing signal or an operation terminating signal to the first projectors MPJ that have not experienced the trouble and are therefore currently in operation. For example, in a case where the projectors PJ in the projection system 1 are connected to one another via the wireless communication, the first projector MPJ that has experienced the trouble transmits the emergency signal to the main projector, which is one of the first projectors MPJ via the communication sections 80. The main projector having received the emergency signal issues an operation terminating command or a shutter closing command to all the first projectors MPJ. Each of the first projectors MPJ in operation transmits the shutter opening signal via the communication section 80 to the backup second projector PPJ paired with the first projector MPJ. Each of the first projectors MPJ then causes the light blocking device 91 provided therein to close the shutter or stops operating to suspend the projection. On the other hand, each of the second projectors PPJ, which are backup projectors, receives the shutter opening signal via the communication section 80. Each of the second projectors PPJ having received the shutter opening signal causes the light blocking device 91 provided therein to open the shutter. That is, all projection images projected on the screen are projection images projected from the second projectors PPJ, which are backup projectors. The second projectors PPJ, which are backup projectors, may switch the projection state to another in response to reception of the shutter opening signal from the main projector or on the basis of another method. In the above description, the main projector is one of the first projectors MPJ but may instead be one of the second projectors PPJ.

As described above, in the second method, the projectors that form the first projectors MPJ and the projectors that form the second projectors PPJ do not project images on the screen at the same time. Therefore, to perform fine adjustment among a plurality of projectors in terms of position, color tone, and other factors, the fine adjustment advantageously only needs to be performed only among the projectors that form the first projectors MPJ and only among the projectors that form the second projectors PPJ.

The light blocking device 91 of each of the projectors PJ may be so provided as to be external thereto. In this case, the light blocking device 91 is connected to the communication section 80 provided in the main projector. Before a trouble occurs in the first projector MPJ, the light blocking device 91 blocks a projection image from the second projector PPJ. The light blocking device 91, when it receives the emergency signal from the main projector, stops blocking the projection image from the second projector PPJ. Further, the light blocking device 91 blocks a projection image from the first projector MPJ having experienced the trouble.

As described above, since each of the projectors PJ includes the control section 10, the communication section 80, the abnormality detecting section 90, and the light blocking device 91, the abnormality detecting section 90 provided in the projector PJ can detect an abnormality having occurred in the projector PJ. Further, the projection system 1 according to the present embodiment includes the second projectors PPJ, each of which is a backup projector and performs projection in the same position where the corresponding first projector MPJ performs projection. A first projector MPJ having detected an abnormality can transmit, via the communication section 80, the emergency signal to the corresponding second projector PPJ, which is a backup projector. The second projector PPJ, which is a backup projector, receives the emergency signal via the communication section 80 provided therein. The backup second projector PPJ having received the emergency signal causes the light blocking device 91 provided therein to open the shutter so as to switch a projection image projected by the first projector MPJ to a projection image projected by the second projector PPJ. Since the first projector MPJ and the second projector PPJ perform projection over the same range, the audience is unlikely to notice that a trouble has been occurred. Further, the first projector MPJ having detected the abnormality having occurred therein via the abnormality detecting section 90 causes the light blocking device 91 to close the shutter so as to stop performing projection. The first projector MPJ having detected the abnormality having occurred therein via the abnormality detecting section 90 may instead stop operating. The configuration described above allows the user's effort of handling a projector-related trouble that occurs in a projector to reduce.

In place of the main projector, a personal computer may be used to control the projectors PJ. In this case, the personal computer is connected to the first projectors MPJ. The personal computer specifies one of the first projectors MPJ as a projector corresponding to the main projector. The personal computer controls the projector corresponding to the main projector to achieve the function described above.

Further, the personal computer may be connected also to the light blocking device 91 so provided as to be external to each of the projectors PJ. When the abnormality detecting section 90 provided in any of the first projectors MPJ detects an abnormality, the personal computer causes the light blocking device 91 to block a projection image from the corresponding second projector PPJ. Further, the personal computer causes the light blocking device 91 to block a projection image from the first projector MPJ.

Overview of Third Embodiment

One example of the projection system according to the third embodiment relates to a projection system (projection system 1 in the example of the third embodiment) including a first projector (first projectors MPJ in the example of the third embodiment), a second projector (second projector PPJ that is one of the second projectors PPJ and paired with the first projector MPJ in the example of the third embodiment), a first light blocking device (light blocking device 91 provided in each of the second projectors PPJ in the example of the third embodiment), and a control apparatus (main projector in the example of the third embodiment) that controls the first projector, the second projector, and the first light blocking device. The first projector includes a first projection section (projection section 20 provided in each of the first projectors MPJ in the example of the third embodiment) that projects a first image (projection images projected from the first projectors MPJ in the example of the third embodiment) based on a first image signal (video signal inputted to the image input section 11 provided in each of the first projectors MPJ and the second projectors PPJ in the example of the third embodiment) on a projection surface (screen in the example of the third embodiment) and an abnormality detecting section (abnormality detecting section 90 provided in each of the first projectors MPJ in the example of the third embodiment) that detects an abnormality having occurred in the first projector. The second projector includes a second projection section (projection section 20 provided in each of the second projectors PPJ in the example of the third embodiment) that projects a second image based on the first image signal on the projection surface, and the second projector is so disposed as to be capable of projecting the second image on the projection surface and in the same position where the first image is projected. The first light blocking device can switch a projection state in which the second projection section projects the second image on the projection surface to a light block state in which the projection of the second image from the second projection section on the projection surface is blocked and vice versa. In a state in which the first projector projects the first image on the projection surface and the projection of the second image from the second projector is blocked by the first light blocking device and in a case where the abnormality detecting section of the first projector detects an abnormality in the first projector, the control apparatus causes the first light blocking device to switch to the projection state so that the second image is projected on the projection surface.

In the example of the projection system according to the third embodiment, the projection system includes a second light blocking device (light blocking device 91 provided in each of the first projectors MPJ in the example of the third embodiment). The second light blocking device can switch a projection state in which the first projection sect ion projects the first image on the projection surface to a light block state in which the projection of the first image from the first projection section on the projection surface is blocked and vice versa. In the state in which the first projector projects the first image on the projection surface and the projection of the second image from the second projector is blocked by the first light blocking device and in the case where the abnormality detecting section of the first projector detects an abnormality in the first projector, the control apparatus causes the second light blocking device to switch to the light block state.

In the example of the projection system according to the third embodiment, the first projector is formed of a plurality of projectors (first projector MPJ1, . . . , first projector MPJn in the example of the third embodiment) that project the first images in different positions, and the second projector is formed of a plurality of projectors (second projector PPJ1, . . . , second projector PPJn in the example of the third embodiment) that project the second images in the same positions where the projectors that form the first projector project the first images.

In the example of the projection system according to the third embodiment, when the abnormality detecting section detects an abnormality in at least one of the plurality of projectors that form the first projector, the control apparatus causes the first light blocking device to switch to the projection state in such a way that all the plurality of projectors that form the second projector project the second images on the projection surface.

In the example of the projection system according to the third embodiment, when the abnormality detecting section detects an abnormality in at least one of the plurality of projectors that form the first projector, the control apparatus causes the first light blocking device to switch to the projection state in such a way that the projector corresponding to the projector having experienced the detected abnormality among the plurality of projectors that form the second projector projects the second image on the projection surface.

In one example of the control apparatus according to the third embodiment, in a state in which the first projector projects the first image based on the first image signal on the projection surface and the first light block device blocks the projection of the second image based on the first image signal from the second projector so disposed as to be capable of projecting the second image on the projection surface and in the same position where the first image is projected, and in the case where an abnormality in the first projector is detected, the first light blocking device is switched to the state in which the second image is projected on the projection surface.

In one example of the control method according to the third embodiment, in the state in which the first projector projects the first image based on the first image signal on the projection surface and the first light block device blocks the projection of the second image based on the first image signal from the second projector so disposed as to be capable of projecting the second image on the projection surface and in the same position where the first image is projected, and in the case where an abnormality in the first projector is detected, the first light blocking device is switched to the state in which the second image is projected on the projection surface.

The embodiments of the invention have been described above in detail with reference to the drawings. It is, however, noted that the specific configurations are not limited to those in the embodiments, and other designs and factors fall within the scope of the invention to the extent that they do not depart from the substance of the invention.

The first embodiment described above (see FIG. 6) shows an aspect in which in the case where the left-end projector PJ1 is the main projector, each of the other projectors PJ projects the identification image DC at the left end of a projection image projected by the projector PJ for detection of the arrangement order of the projectors PJ. Instead, when each of the projectors PJ is configured to project the identification image DC on each of the right and left sides of the projection image projected by the projector PJ, the arrangement order of the projectors PJ can be detected irrespective of the position of the main projector.

Even in a case where the projectors PJ are arranged alongside of one another in the upward/downward direction, the arrangement order can be detected by using the same method in the first embodiment described above. For example, in a case where the uppermost projector PJ is assigned as the main projector, each of the other projectors PJ may display the identification image DC in the upper-end overlapping projection area OA of the projection image projected by the projector PJ. Further, when the identification image DC is displayed at each of the upper and lower ends of the projection image, the arrangement order of the projectors PJ can be detected irrespective of the position of the main projector.

Even in a case where the projectors PJ are arranged in a matrix along the upward/downward and rightward/leftward directions, the arrangement order can be detected by using the same method.

FIG. 19 is a descriptive diagram showing that 9 projectors PJ arranged in a matrix formed of 3 rows and 3 columns project images.

For example, in a case where the projector PJ that projects an image in a projection image area PA1 at the upper left corner indicated by the broken line in FIG. 19 is assigned as the main projector, each of the projectors PJ excluding the main projector may display the identification image DC in the overlapping projection area OA at the upper left corner of the projection image projected by the projector PJ. Specifically, the projector PJ that performs projection over a projection image area PA2 projects an identification image DC3. The projector PJ that performs projection over a projection image area PA3 projects an identification image DC4. Similarly, the plurality of projectors PJ that perform projection over projection image areas PA4 to PA9 project identification images DC5 to DC10, respectively.

The main projector detects the identification image DC in the overlapping projection area OA in the projection image projected by the main projector on the basis of a captured image captured by the main projector to identify the projectors PJ adjacent to the main projector and repeats afterward the detection of the identification images DC projected by the other projectors PJ on the basis of captured images captured by the adjacent projectors PJ. Specifically, the main projector detects the identification images DC3, DC5, and DC6 in the overlapping projection areas OA in the projection image projected by the main projector. The main projector identifies the projector PJ adjacent to and on the right of the main projector on the basis of the detected identification image DC3, identifies the projector PJ adjacent to and below the main projector on the basis of the detected identification image DC5, and identifies the projector PJ adjacent to and on the lower right of the main projector on the basis of the detected identification image DC6. Further, the main projector detects the identification images DC projected by the other projectors PJ on the basis of captured images captured by the identified projectors PJ adjacent to the main projector. The main projector detects the arrangement order of the projectors PJ arranged in the matrix along the upward/downward and rightward/leftward directions on the basis of the detected identification images DC.

The position where a projector PJ projects the identification image DC will next be described with reference to FIG. 20.

FIG. 20 shows an example of the position of the identification image DC projected in the overlapping projection area OA by a projector PJ.

As shown in FIG. 20, when three identification images DC in total are displayed at one of the four corners of a projection image and in central portions (portions excluding ends) of the two sides facing the corner (the upper left corner, a central portion of the right side, and a central portion of the lower side of the projection image in the example shown in FIG. 20), the arrangement order of the projectors PJ can be detected irrespective of the position of the main projector. Specifically, each of the projectors PJ excluding the main projector projects an identification image DC11 at one of the four corners of the projection image area PA and further projects identification images DC12 and DC13 in central portions of the two sides facing the corner. The three positions where the identification images DC are projected are not limited to the upper left corner, the central portion of the right side, and the central portion of the lower side of the projection image described above, and a different combination of locations may instead be used. Each of the identification images DC only needs to be projected in a position where the identification image DC does not overlap with the identification images DC projected by the other projectors PJ.

Figure 21:
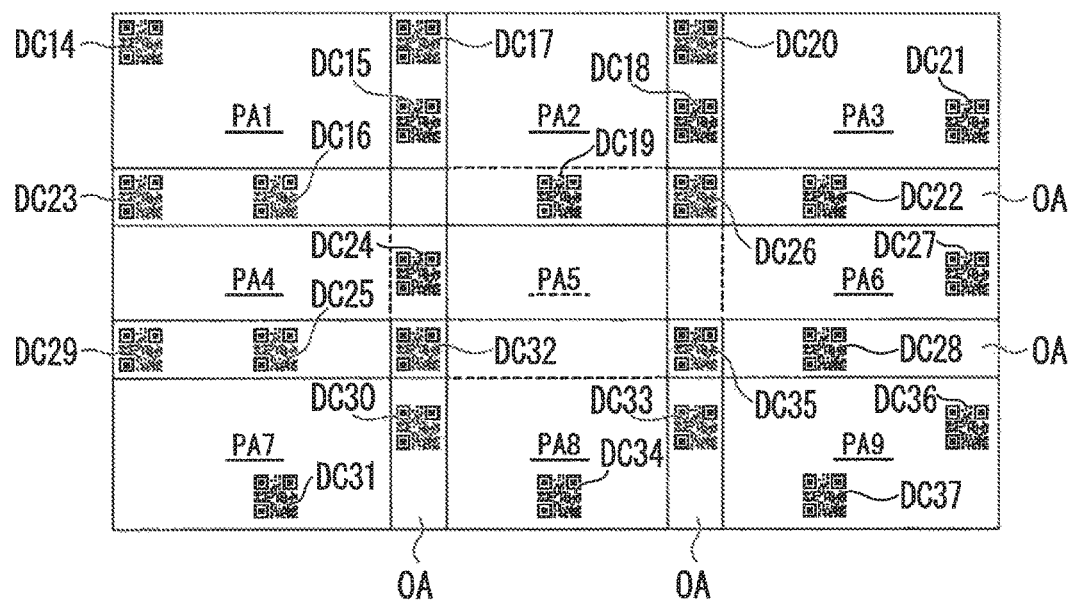
FIG. 21 is a descriptive diagram showing that 9 projectors arranged in a matrix formed of 3 rows and 3 columns project images.

FIG. 21 is a descriptive diagram showing that 9 projectors PJ arranged in a matrix formed of 3 rows and 3 columns project images and shows a case where the projector PJ that projects an image in a central projection image area PA5 indicated by the broken line is assigned as the main projector. When each of the other projectors PJ excluding the main projector displays the three identification images DC at the upper left corner, at a central portion of the right side, and at a central portion of the lower side of a projection image projected by the projector PJ, the identification images DC from the projectors PJ are so displayed as not to overlap with each other, and each of the imaging sections 30 captures an image of corresponding ones of the identification images DC.

More specifically, the main projector that performs projection over the projection image area PA5 detects identification images DC19, DC24, DC26, DC32, and DC35 projected in the overlapping projection areas OA on the basis of a captured image captured by the main projector. The main projector identifies the projector PJ that projects an image over the projection image area PA2 on the basis of the detected identification image DC19. The projection image area PA2 is the area projected over a portion above the projection image area PA5. The main projector identifies the projector PJ that projects an image over the projection image area PA4 on the basis of the detected identification image DC24. The projection image area PA4 is the area projected over a portion on the left of the projection image area PA5. The main projector identifies the projector PJ that projects an image over the projection image area PA6 on the basis of the detected identification image DC26. The projection image area PA6 is the area projected over a portion on the right of the projection image area PA5. The main projector identifies the projector PJ that projects an image over the projection image area PA8 on the basis of the detected identification image DC32. The projection image area PA8 is the area projected over a portion below the projection image area PA5. The main projector identifies the projector PJ that projects an image over the projection image area PA9 on the basis of the detected identification image DC35. The projection image area PA9 is the area projected over a portion on the lower right of the projection image area PA5. The main projector detects the arrangement order of the remaining projectors PJ on the basis of the identification images DC imaged by the identified other projectors PJ.

The projectors PJ may be configured to display the identification images DC sequentially at certain time intervals. In this case, the identification images DC projected by the projectors PJ do not overlap with each other irrespective of the positions where the identification images DC are projected in each overlapping projection area OA. Further, in a case where the imaging section 30 provided in each of the projectors PJ can capture an image of a range sufficiently larger than a projection image projected by the projector PJ, the identification image DC may be displayed in a position outside the overlapping projection area OA. In this case, even when the projectors PJ simultaneously display the identification images DC, the identification images DC do not overlap with each other.

In the embodiments described above, a transmissive projector is presented by way of example. Instead, a projector based on a DLP (digital light processing: registered trademark of Texas Instruments Incorporated, USA) using a reflective light modulator called a DMD (digital micromirror device: registered trademark of Texas Instruments Incorporated, USA) may be used.

A program for achieving the function of an arbitrary constituent part in the projection system 1 described above may be recorded (stored) on a computer readable recording medium (storage medium), and the program may be read and executed by a computer system. The term "computer system" used herein is assumed to include an operating system (OS) or hardware, such as a peripheral apparatus. The term "computer readable recording medium" refers to a portable medium, such as a flexible disk, a magneto-optical disk, a ROM (read only memory), and a CD-ROM (compact disc ROM), and a storage device, such as a hard disk drive built in the computer system. Further, the "computer readable recording medium" is assumed to encompass a component that holds a program for a fixed period, such as a volatile memory (RAM: random access memory) in a computer system that works as a server or a client in a case where the program is transmitted over the Internet or any other network or a telephone circuit or any other communication circuit.

The program described above may be transmitted from the computer system including the storage device or any other component that stores the program to another computer system via a transmission medium or a transmission wave traveling through a transmission medium. The term "transmission medium" used herein, through which the program is transmitted, refers to a medium having the function of transmitting information, such as the Internet and other networks (communication networks) and a telephone circuit and other communication circuits (communication lines).

The program described above may instead be a program that achieves part of the function described above. The program described above may still instead be a program that achieves the function described above when combined with a program having already been recorded in the computer system, that is, what is called a difference file (difference program).

What is claimed is:

1. A projection system comprising:
a plurality of projectors including a first projector and a second projector that project images side by side, wherein
the first projector includes
a first projection section that projects a first image, and
a first control section that causes the first projection section to project an identification image containing identification information, and
the second projector includes
a second projection section that projects a second image,
an imaging section that captures an image of a range including a projection range of the second projection section to produce a captured image, and
a second control section that causes the imaging section to capture an image of the identification image projected by the first projector, acquires the identification information on the first projector based on the captured identification image, and determines a position of the first image relative to the second image based on a position of the identification image in the captured image.

2. The projection system according to claim 1, wherein the first control section causes the first projection section to project the identification image in such a way that the identification image is displayed in a peripheral portion of a projection range of the first projection section.

3. The projection system according to claim 1, wherein
the first projector includes a first communication section,
the second projector includes a second communication section,
the identification image contains connection information for connection with the first projector,
the second control section acquires the connection information based on the captured identification image, and
the second communication section establishes connection with the first communication section and performs communication therewith based on the connection information acquired by the second control section.

4. The projection system according to claim 3, wherein the second projector includes an address changing section that changes an address of the first projector.

5. A projector comprising:
a projection section that projects a first image;
an imaging section that captures an image of a range including a projection range of the projection section to produce a captured image; and
a control section that causes the imaging section to capture an image of an identification-information-containing identification image projected by another projector that projects an image in such a way that the image projected by the projector and the image projected by the other projector are arranged side by side, acquires the identification information on the other projector based on the captured identification image, and determines a position of a second image projected from the other projector relative to the first image based on a position of the identification image in the captured image.

6. A projector controlling method for controlling a projector including a projection section that projects a first image and an imaging section that captures an image of a range including a projection range of the projection section to produce a captured image, the method comprising:
causing the imaging section to capture an image of an identification-information-containing identification image projected by another projector that projects an image in such a way that the image projected by the projector and the image projected by the other projector are arranged side by side;
acquiring the identification information on the other projector based on the captured identification image; and
determining a position of a second image projected from the other projector relative to the first image based on a position of the identification image in the captured image.

* * * * *